United States Patent [19]

Mago

[11] 4,251,861

[45] Feb. 17, 1981

[54] CELLULAR NETWORK OF PROCESSORS

[76] Inventor: Gyula A. Mago, Two Winmore La., Chapel Hill, N.C. 27514

[21] Appl. No.: 955,414

[22] Filed: Oct. 27, 1978

[51] Int. Cl.$^3$ .................. G06F 13/00; G06F 15/00
[52] U.S. Cl. .................................................. 364/200
[58] Field of Search .............................. 364/200, 900

[56] References Cited

U.S. PATENT DOCUMENTS

| | | | |
|---|---|---|---|
| 3,812,469 | 5/1974 | Hauck et al. | 364/200 |
| 3,924,245 | 12/1975 | Eaton et al. | 364/200 |
| 3,962,706 | 6/1976 | Dennis et al. | 364/900 |
| 3,978,452 | 8/1976 | Barton et al. | 364/200 |
| 4,075,694 | 2/1978 | Ericsson | 364/200 |

*Primary Examiner*—Jerry Smith

*Attorney, Agent, or Firm*—George E. Clark

[57] ABSTRACT

A network of processors having a cellular structure is capable of directly and efficiently executing a predetermined class of programing languages such as applicative languages. The network includes two interconnected networks of processors, one of which is a linear array of cells of a first kind and the other a tree network of cells of a second kind. The network directly interprets a high level language and is capable of operating on a wide range of classes of programs. Within practical limits, the network accommodates the unbounded parallelism permitted by applicative languages in a single user program. The network also has the capability of executing many user programs simultaneously.

26 Claims, 44 Drawing Figures

BEFORE REDUCTION

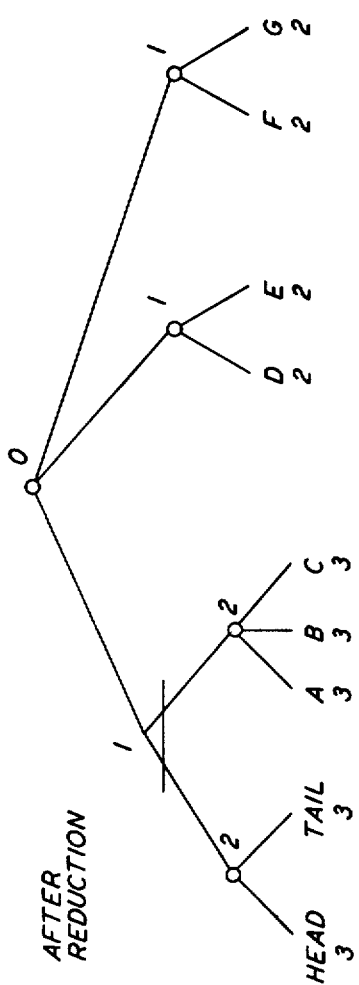

BEFORE REDUCTION
| | < | | AND | | ( | | T | | | F |
|---|---|---|---|---|---|---|---|---|---|---|
| | 0 | | 1 | | 1 | | 2 | | | 2 |
| 1 | 2 | 3 | 4 | 5 | 6 | 7 | 8 | 9 | 10 | 11 |
*FIG. 5a*
AFTER REDUCTION
| | F | | | | | | | | | |
|---|---|---|---|---|---|---|---|---|---|---|
| | 0 | | | | | | | | | |
| 1 | 2 | 3 | 4 | 5 | 6 | 7 | 8 | 9 | 10 | 11 |
*FIG. 5b*
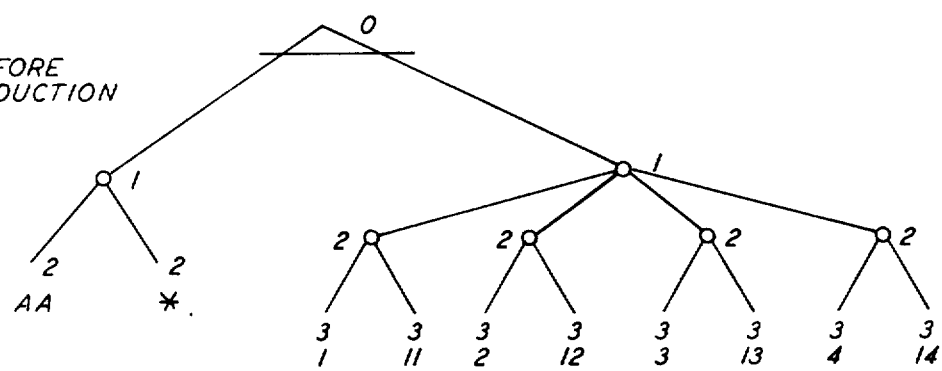
*FIG. 6a*
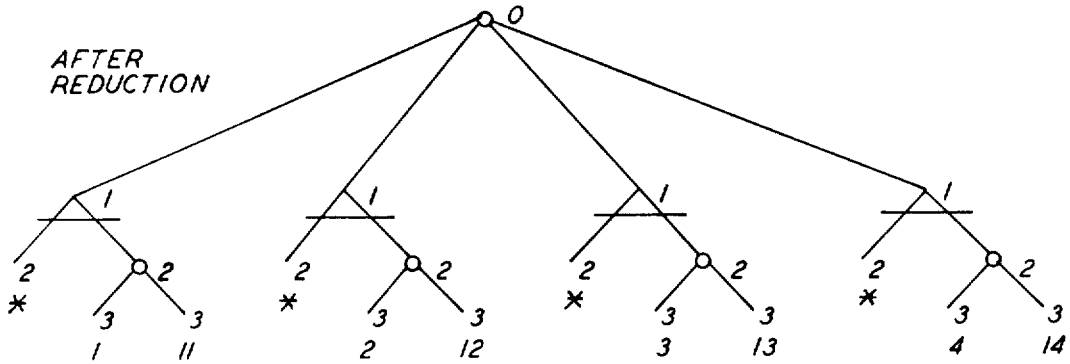
*FIG. 6b*

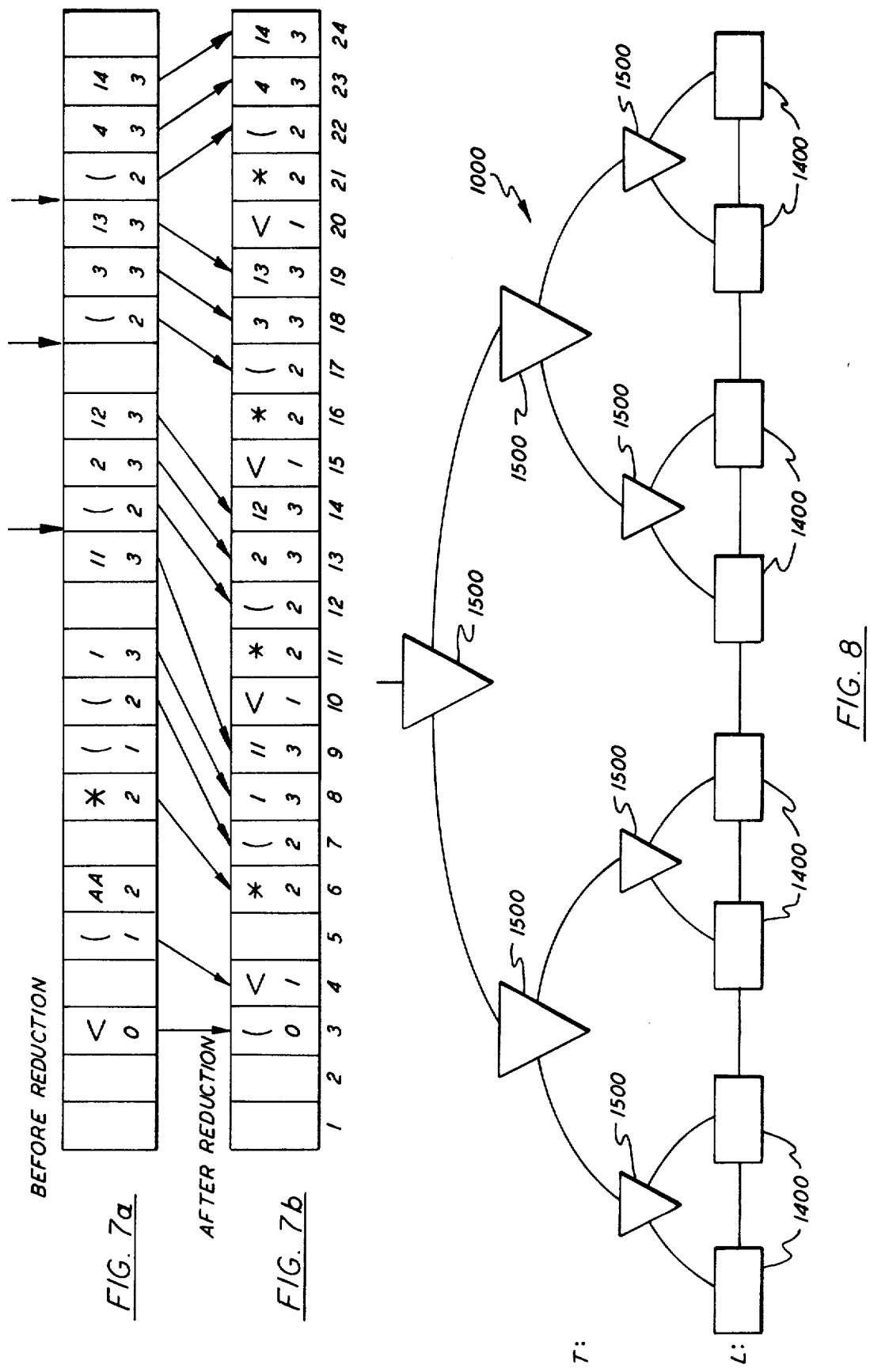

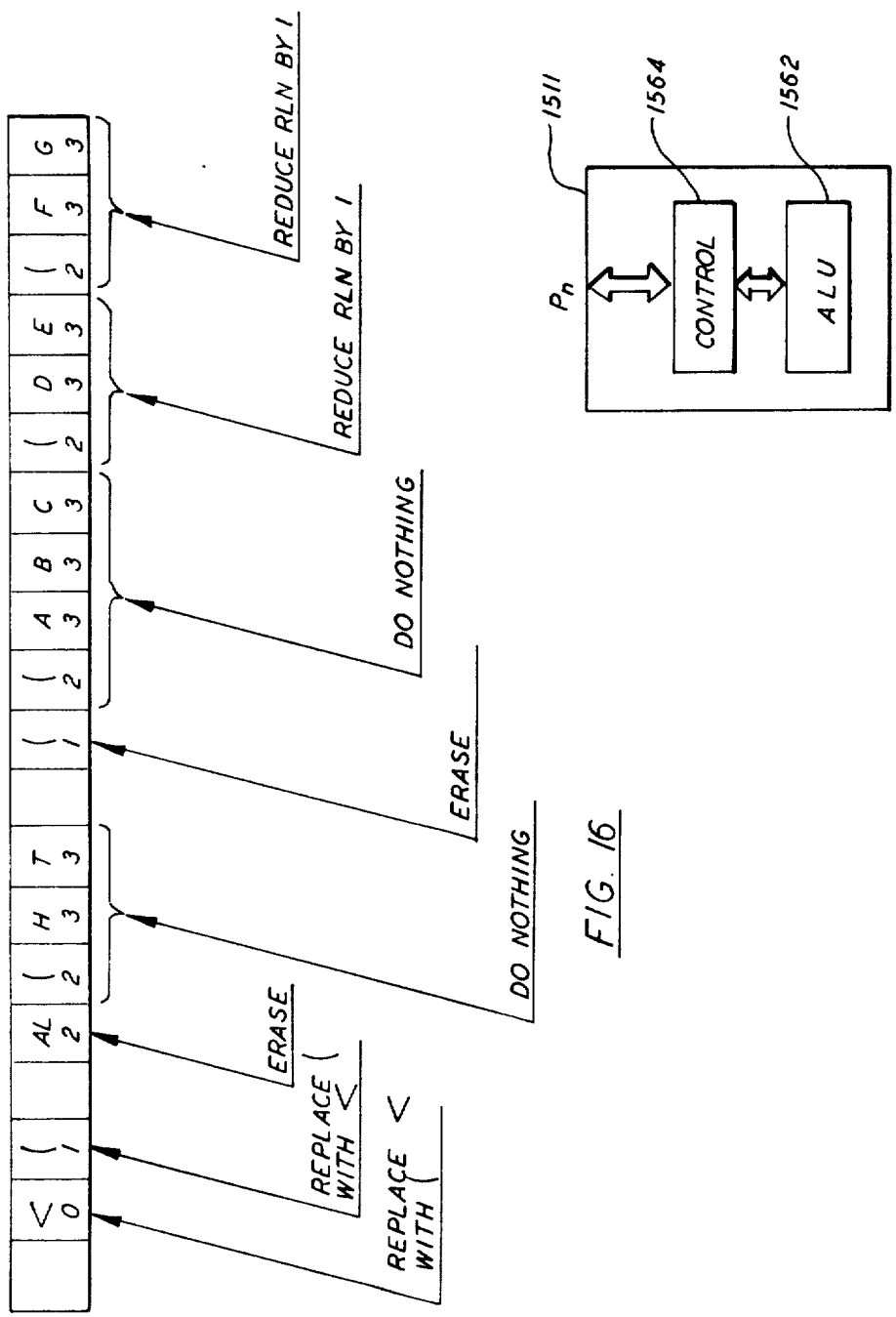

| CONSTITUENT OF SOURCE TEXT | DESTINATION EXPRESSION | SEGMENT OF MICROPROGRAM |
|---|---|---|
| </0 | (S/0): | 4: S := "("; |
| (/1 | (S/1): | 4: IF S = "(" <br> THEN S: = "<" <br> ELSE S: = "1"; |
| AL/2 | (S/2): | ERASE; |
| f/2 | (E/2): | DO NOTHING; |
| (/1 | (E/1): | 4: IF (RLN=1) & (S="(") <br> THEN ERASE <br> ELSE S: = "1"; <br> MARK WITH X; <br> 8: IF POS ≠ 1 <br> THEN DO NOTHING <br> ELSE RLN: = RLN-1; |

FIG. 17

| CONSTITUENT OF SOURCE TEXT | DESTINATION EXPRESSION | SEGMENT OF MICROPROGRAM |
|---|---|---|
| </0 | (S/0): | S:=M2(1); |
| AND/1 | (S/1): | ERASE; |
| (/1 | (E/1): | 4: IF (RLN=1) & (S≠"(") <br> THEN S:="1"; <br> 4: IF (RLN=2) <br> THEN SEND IC(AND,S); <br> 4: IF (RLN>2) <br> THEN S:= "1"; |

FIG. 18

| CONSTITUENT OF SOURCE TEXT | DESTINATION EXPRESSION | SEGMENT OF MICROPROGRAM |
|---|---|---|
| </0 | (S/0): | 4: S:="("; |
| (/1 | (S/1): | 4: IF S="(" THEN S:= "<" ELSE S:= "1"; |
| AA/2 | (S/2): | ERASE; |
| _f_/2 | (E/2): | MARK WITH X; |
| (/1 | (E/1): | MARK WITH Y; |
| | | 4: IF (RLN=1) & (S="(") THEN ERASE ELSE S:= "1"; |
| | | 18: IF POS#< LENGTH THEN INSERT S(RIGHT,<,1); |
| | | 18: IF POS# >1 THEN INSERT E(LEFT,X,+0); |

FIG. 19

| | | | | | | | | | | | | | | | |
|---|---|---|---|---|---|---|---|---|---|---|---|---|---|---|---|
| S | < | OP | ( | ( | A | B | C | D | ( | E | F | G | ( | H | I | ( | K |
| RLN | 0 | 1 | 1 | 2 | 3 | 3 | 3 | 3 | 2 | 3 | 3 | 3 | 2 | 3 | 3 | 2 | 3 |
| MARKER 1 | | | X | X | X | X | X | X | X | X | X | X | X | X | X | X |
| N1 | | | 1 | 2 | 3 | 4 | 5 | 6 | 7 | 8 | 9 | 10 | 11 | 12 | 13 | 14 | 15 |
| L1 | | | 15 | 15 | 15 | 15 | 15 | 15 | 15 | 15 | 15 | 15 | 15 | 15 | 15 | 15 | 15 |
| MARKER 2 | | | X | | | | X | | | X | | | X | | |
| POS # | | | 1 | 1 | 1 | 1 | 1 | 2 | 2 | 2 | 2 | 3 | 3 | 3 | 4 | 4 |
| LENGTH | | | 4 | 4 | 4 | 4 | 4 | 4 | 4 | 4 | 4 | 4 | 4 | 4 | 4 | 4 |
| N2 | | | 1 | 2 | 3 | 4 | 5 | 1 | 2 | 3 | 4 | 1 | 2 | 3 | 1 | 2 |
| L2 | | | 5 | 5 | 5 | 5 | 5 | 4 | 4 | 4 | 4 | 3 | 3 | 3 | 2 | 2 |
| L/R | | | L | | | R | L | | | R | L | | R | L | R |

FIG. 20

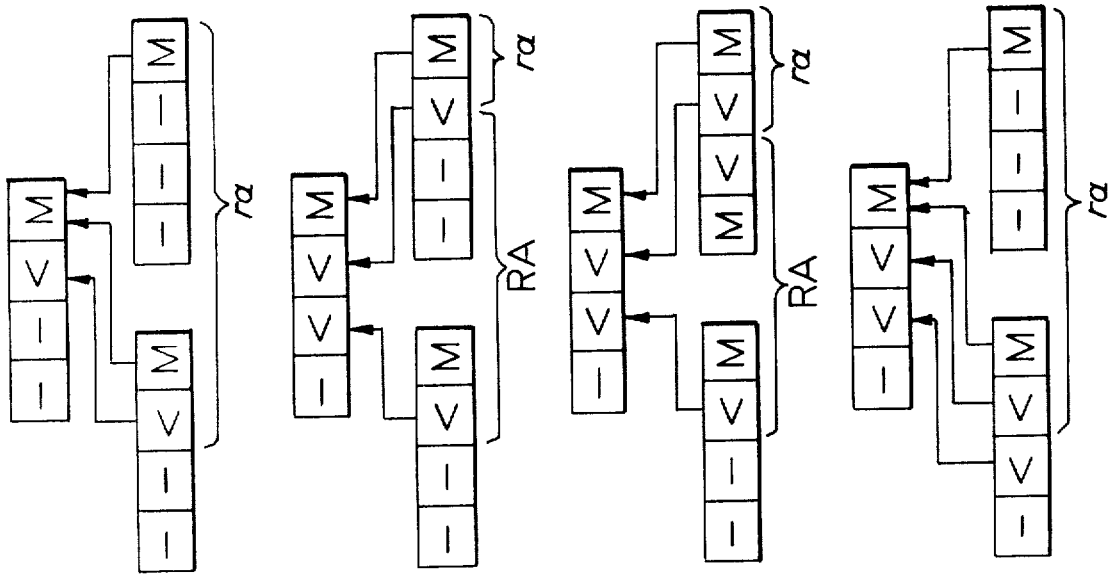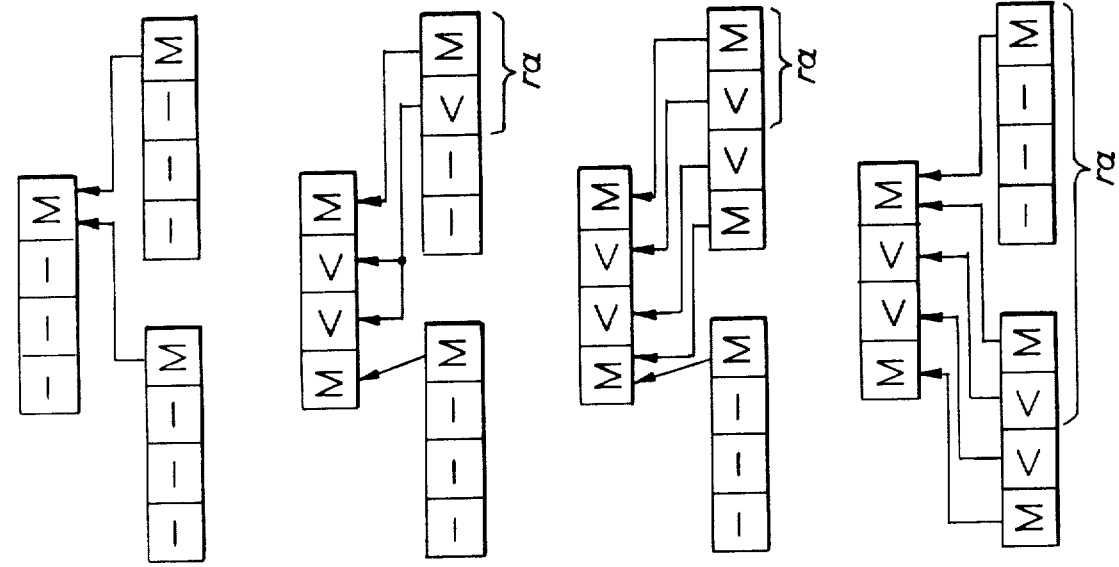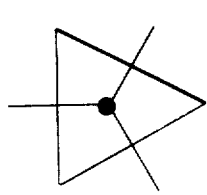
FIG. 22a
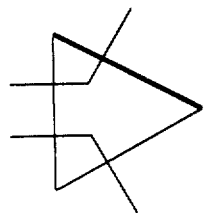
FIG. 22b
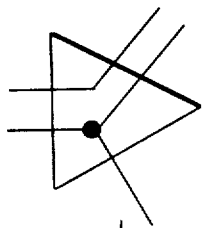
FIG. 22c
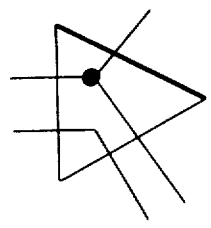
FIG. 22d

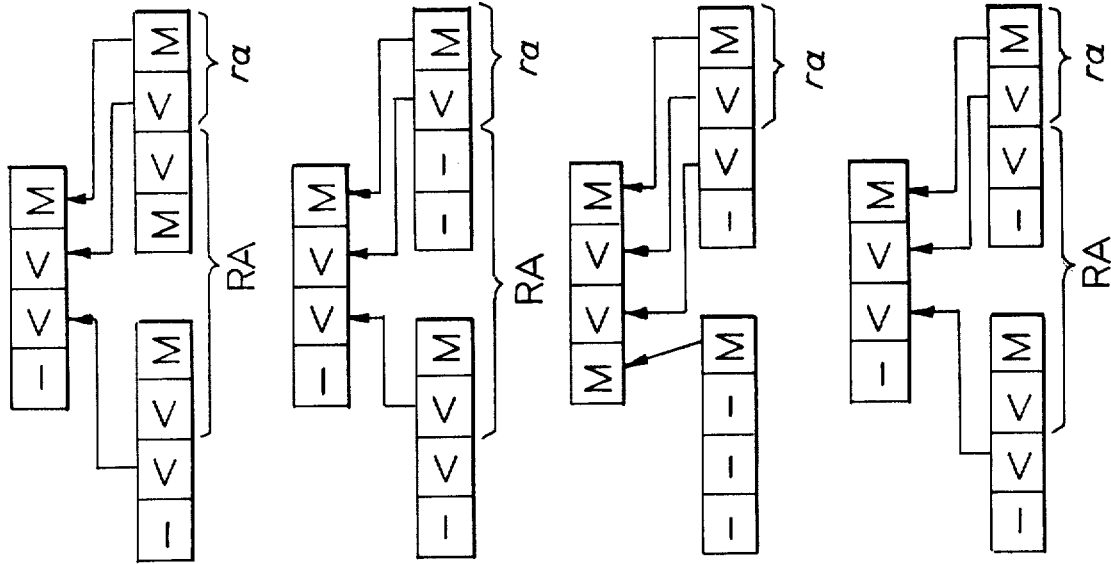
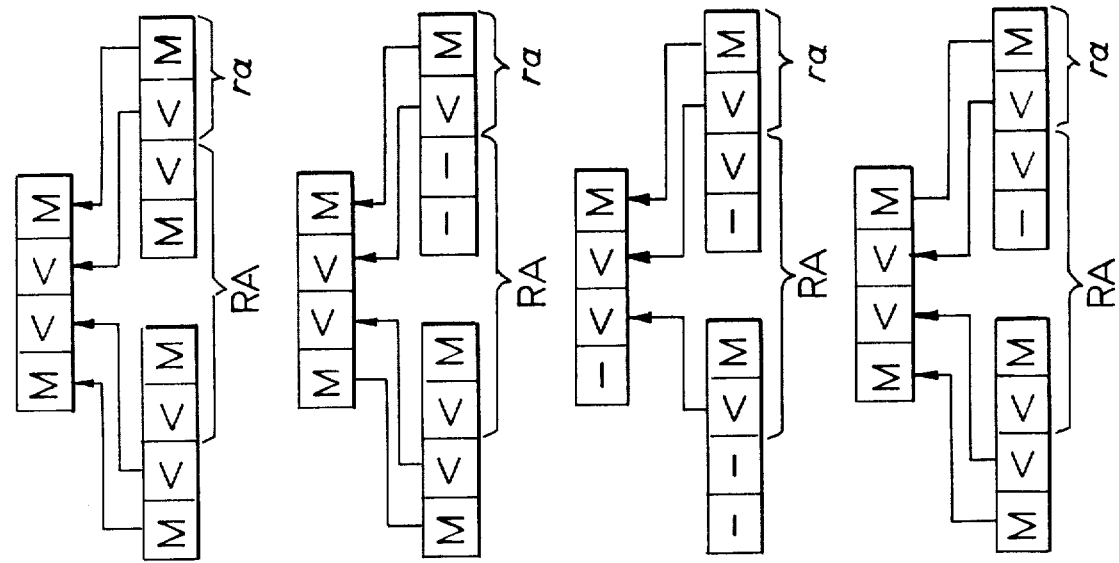
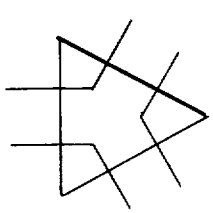
FIG. 22e
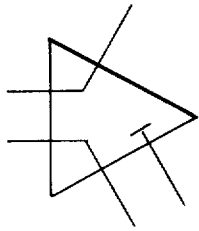
FIG. 22f
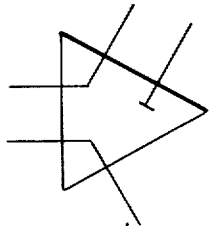
FIG. 22g
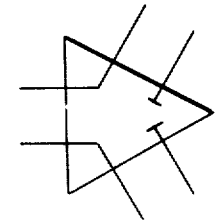
FIG. 22h

CELLULAR NETWORK OF PROCESSORS

TABLE OF CONTENTS

I. BACKGROUND OF THE INVENTION
  A. Field of the Invention
  B. Applicative Languages
  C. Prior Art
II. SUMMARY OF THE INVENTION
  A. Objects of the Invention
  B. Summary Statement of the Invention
  C. Features and Advantages of the Invention
III. BRIEF DESCRIPTION OF THE DRAWING
IV. DETAILED DESCRIPTION OF A PREFERRED EMBODIMENT OF THE INVENTION
  A. Computational Requirements of Applicative Languages
    1. Representation of Syntactic Aspects
    2. Representation of Semantic Aspects of Inner Most Application
      a. Description of Primitive Operators
      b. Defined Operators
      c. Composite Operators
        1. Regular Composition
        2. Meta Composition
    3. Order of Evaluation
    4. Locating Innermost Applications
  B. Description of Network of Processors
    1. Interconnection Pattern of Cells
    2. The Partitioned Processor
    3. Organization, States and State Changes
    4. Cell Organization
      a. L Cells
      b. T Cells
    5. Microprogramming Language
      a. Sample Microprograms
      b. Description of Microprogramming Language
    6. Internal Mechanisms
      a. Partitioning
      b. Distribution of Microprograms
      c. Marking Expressions
      d. Messages
      e. Data Movement
      f. Storage Management
        1. Preparation for Storage Management
        2. Storage Management Process
    7. Input/Output Operations
  C. Performance Evaluation
  D. SUMMARY
CLAIMS

I. BACKGROUND OF THE INVENTION

A. FIELD OF THE INVENTION

This invention relates to information handling systems and more particularly to information handling systems having a plurality of cellular processors connected in a predetermined structure to efficiently execute predetermined classes of programming languages.

B. SELECTED CLASSES OF APPLICATIVE LANGUAGES

Applicative languages have been defined in papers by J. W. Backus entitled PROGRAMMING LANGUAGE SEMANTICS AND CLOSED APPLICATIVE LANGUAGES, *Conference Record of ACM Symposium On Principles of Programming Languages*, Boston, Massachusetts, October, 1973, and "Reduction Languages and Variable-Free Programming", IBM Research Report RJ1010, Yorktown Heights, New York, April, 1972. In these papers, Backus defines classes of programming languages having a high degree of versatility in problem solving.

For further description and discussion of applicative languages reference is made to the Backus papers which are incorporated by reference although not fully set forth herein.

Another reference to applicative languages and more particular to a system for realizing a specific reduction language as a machine is shown by Berkling in his paper entitled REDUCTION LANGUAGES FOR REDUCTION MACHINES, *Proceedings of the Second Annual Symposium On Computer Architecture*, Houston, Texas, January 1975. As above, although Berkling is not set forth completely herein, reference is made to the concepts relating to reduction languages in the Berkling paper.

Reduction languages as described by Backus, are a class of high level, applicative, programming languages with several unique and attractive properties. (In an applicative programming language the elementary step of computation is the application of a function or operator to its operand(s).) Among currently used program languages they can be likened to APL or LISP, but the property of greatest interest is that they are capable of expressing parallelism in a natural fashion, not requiring instruction from the programmer to initiate and terminate execution paths.

Any program written in a reduction language contains a few syntactic markers, and so-called atomic symbols. The latter may serve as data items, primitive operators, or names of defined functions. Only two kinds of composite expressions are allowed, each composed of other expressions, which are usually referred to as subexpressions. A sequence of length n, $n \geq 0$, denoted by (a1, a2, . . . , an) if $n \geq 1$ and $\phi$ otherwise, where ai (called the ith element of the sequence) is an arbitrary well-formed expression. An application is denoted by $<a, b>$, where a (called the operator) and b (called the operand) are again well-formed expressions.

Of these two forms of composite expressions only applications specify computations. Since the program text at any time may contain many applications, possibly nested, sequencing among them is specified (at least partially) by requiring that only innermost applications can be executed. There is no sequencing requirement among innermost applications—they can be executed in any order. The process of executing an innermost application is called a reduction, and so we shall often refer to an innermost application as a reducible application (RA).

A reduction results in replacing an innermost application with the result expression, which may, in turn, contain further applications. The reduction rules relevant to innermost applications can be summarized as follows. If the operator is an atomic symbol, it might be a primitive operator (in which case its effect is specified by the language definition), or it might be the name of a defined function, i.e., of some well-formed expression containing no application (in which case the atomic symbol is replaced by that expression). If the operator is a sequence, it is interpreted as a composite operator, composed of the elements of the sequence (Backus describes two possible alternatives: regular and meta composition). The computation comes to a halt when there are no more reducible applications left, and the program text so produced is the result of the computation. If the result of a reduction is undefined, the symbol ⊥ is used to denote it, which is neither a syntactic marker, nor an atomic symbol, but a special expression.

The following example should illustrate most of these concepts. Assume the IP (inner product) is a defined operator, representing IP=(+, (AA,*),TR), whereas AA (apply to all), TR (transpose), +(addition), and * (multiplication) are primitive operators of a reduction language. Suppose the initial program text is <IP, ((1,2,3,4), (11,12, 13,14))>. First IP gets replaced by its definition, resulting in <(+, (AA,*), TR), ((1,2,3,4), (11,12,13,14))>. Since the operator now is a regular composition of three expressions, after a few reductions we get the following program text: <+, <(AA,*), <TR, ((1,2,3,4), (11,12,13,14))>>>. Now TR is the operator of the only innermost application, and the result of applying TR to the two sequences of the operand is <+, <(AA,*), ((1,11), (2,12), (3,13), (4,14)>>. The only innermost application has a composite operator again, but this time it is a meta composition, resulting in <+, <*, (1,11)>, <*, (2,12)>, <*, (3,13)>, <*, (4,14)>)>. Now we have four innermost appications, and they can be reduced in any order, but the addition operator cannot be applied until all multiplications are complete, so at some point we must have the program text <+, (11,24,39,56)>, which finally reduces to the number 130.

C. PRIOR ART

In the prior art, there are many teachings relative to multiple processor information handling systems.

An article by William L. Spetz appearing in Computer Magazine, July, 1977, at page 64 and following entitled Microprocessor Networks, gives a general survey of a number of approaches to connecting a number of independent processors to enhance system performance. Although Spetz does at page 66 discuss hierarchical pyramid systems, he does not discuss a cellular processor in the sense of the instant invention nor does Spetz consider the application of these multiprocessing systems to the execution of programs in applicative languages. In fact, Spetz indicates in his discussion that the pyramid system is generally not to be favored because of what he considers to be practical, reliability, turn around time and developmental difficulties.

U.S. Pat. No. 3,287,703 shows a computer system employing a number of processing units operating under the control of a single central control unit wherein each of the processing elements can communicate with its immediate neighbors but all communications with the central control unit must be fed through a single branching unit which involves a significant bottleneck. A system according to this patent includes a single program memory. However, the patent does not contemplate the execution of programs in applicative languages as does the instant invention.

U.S. Pat. No. 3,978,452 discloses a data driven network of uniform processing or function modules coupled with local storage unit which may be partitioned to accommodate various concurrent operations. The device of the patent is not cellular in construction, nor does it contemplate the execution of language primitives by the cooperation of a group of processors.

U.S. Pat. No. 3,962,706 shows a data processing system for executing stored programs in a parallel manner. The device of this patent is not cellular in construction, and it does not contemplate the execution of language primitives by the cooperation of a group of processors.

U.S. Pat. No. 3,593,300 discloses a parallel processor system in which all of the processors are dependent upon a single large scale storage system in the classical von Neumann manner.

The patent does not contemplate execution of programs in an applicative language.

U.S. Pat. No. 3,959,775 teaches a multiprocessing system employing a number of microprocessors as processing elements in which a system control assigns priority to each of the microprocessors for access to the system bus and access to the system memory. Again the teachings of the patent relate to a conventional von Neumann computer and do not contemplate solution of problems stated in an applicative language.

U.S. Pat. No. 3,940,743 teaches a system interconnect unit for connecting together a number of independently operating data processing systems wherein when a unit accesses an interconnect system, the unit acts as a peripheral device in the conventional von Neumann manner. The patent does not teach execution of problems in applicative languages.

U.S. Pat. No. 3,566,363 teaches an early multiprocessing computing system including a specific discussion of interprocessor communication and control. As above, the patent is concerned only with conventional von Neumann computer systems and does not contemplate problem solving using applicative languages.

In a paper entitled "A General Purpose Array with a Broad Spectrum of Applications," published in the proceedings of the Workshop on Computer Architecture, May 22 and 23, 1975, Erlangen, Handler et. al. discuss a system of processors in which processors defined as array processors function to process jobs submitted by a second level of processor. Each of the processors discussed in the paper are capable of executing programs of a predetermined size and thus a small network containing as few as four array processors can function to execute various kinds of programs. Although the paper discusses the system as a freely extensible cellular structure, it is impossible for all cells to be identical; for example, the paper states "the C processor is responsible for overall control, for allocating suitable parts of the array to jobs, and for providing the B processors with control information." From this it is clear that the C processor must have full knowledge about all A and B processors under it. That is it must know what they contain, etc. (In addition, as the size of the pyramid increases, the size of B and C processors must be proportional to how high up in the pyramid they are, hence the network cannot be cellular.) The paper does not address the problem of how to effectively program such a system to take maximum advantage of the parallel processing capabilities provided. The paper does not deal with the solution of problems expressed in applicative languages.

U.S. Pat. No. 3,646,523 discloses a computer whose machine language is the lambda calculus. However, the apparatus disclosed is not cellular in nature, but rather it comprises a number of von Neumann processors, a large linear memory, and a central communication facility, in which an associative memory system is used as the common element between a number of processing units.

The following is a list of publications which may relate to processor networks or applicative languages:

J. B. Dennis, "Computation Structures," *COSINE Committee Lectures*, Princeton University, Department of Electrical Engineering, Princeton, New Jersey, July, 1968.

J. B. Dennis, "Programming Generality, Parallelism and Computer Architecture," *Information Processing 68*, North-Holland Publishing Co., 1969, pp. 484-492.

J. B. Dennis, "First Version of a Data Flow Procedure Language, "*Lecture Notes in Computer Science*, vol. 19, pp. 362-376, Springer Verlag, N.Y., 1974.

J. B. Dennis and D. P. Misunas, "A Preliminary Architecture for a Basic Data-Flow Processor," *Proceedings of the 2nd Annual Symposium on Computer Architectures*, IEEE, N.Y., 1975, pp. 126-132.

A. W. Holt and F. Commoner, "Events and Conditions," *Record of the Project MAC Conference on Concurrent Systems and Parallel Computation*, ACM, N.Y., 1970, pp. 3-52.

P. McJones, *A Church-Rosser Property of Closed Applicative Languages*, IBM Research Report RJ1589, Yorktown Heights, N.Y., May, 1975.

S. S. Patil and J. B. Dennis, "The Description and Realization of Digital Systems," *Revue Francaise d'Automatique, Informatique et de Recherche operationelle*, pp. 55-69, February, 1973.

C. A. Petri, *Kommunikation mit Automaten*, Schriften des Rheinisch-Westfalischen Institutes for Instrumentelle Mathematik an der Universitate Bonn, Nr. 2, Bonn, 1962.

K. J. Thurber, *Large Scale Computer Architecture—Parallel and Associative Processors*, Hayden Book Co., Rochelle Park, N.J., 1976.

II. SUMMARY OF THE INVENTION

A. Objects of the Invention

It is an object of the present invention to directly execute a predetermined class of applicative languages in an information handling system which includes a plurality of interconnected cells each containing at least one processor.

It is another object of the present invention to directly and efficiently execute a predetermined class of applicative languages in an information handling system including a plurality of interconnected cells each containing at least one processor.

It is another object of the present invention to directly and efficiently execute a predetermined class of applicative languages by providing an unbounded degree of parallelism in the execution of any user program.

It is yet another object of the present invention to directly and efficiently execute a predetermined class of applicative languages by providing for the simultaneous execution of a plurality of user programs.

It is yet another object of the present invention to directly and efficiently execute a predetermined class of applicative languages in an information handling system that has a cellular structure and whose size may be extended without limit.

It is yet another object of the present invention to directly and efficiently execute a predetermined class of applicative languages in an information handling system including a plurality of interconnected cells, each containing at least one processor and logic means connecting the processors to form disjoint assemblies of the processors, the logic means being responsive to syntactic markers to partition the plurality of interconnected cells into separate disjoint assemblies of processors in which subexpressions can be evaluated.

It is yet another object of the present invention to directly and efficiently execute a predetermined class of applicative languages in an information handling system including a tree network of interconnected cells, each containing at least one processor and an array of cells, each containing at least one processor wherein each cell in the array is connected to one of the cells in the tree network, logic means for connecting the processors to form disjoint assemblies of the processors the logic means being responsive to syntactic markers to partition the plurality of interconnected cells into separate disjoint assemblies of processors in which subexpressions can be evaluated and input/output means for entering applicative expressions into the cells and for removing results from the cells after evaluation of the applicative expressions.

It is yet another object of the present invention to execute a predetermined class of applicative languages in an information handling system as above wherein each of the cells in the array of cells are connected to one or more other cells in the array.

B. Summary Statement of the Invention

Accordingly, an information handling system for parallel evaluation of applicative expressions formed from groups of subexpressions, said groups of subexpressions being seperated by syntactic markers, includes a plurality of interconnected cells each containing at least one processor, the cells being divided into a tree structure of interconnected cells and a group of cells, each cell of which is connected to one of the cells in the tree network, logic means for connecting the processors within the cells to form disjoint assemblies of the processors, the logic means being responsive to the syntactic markers to partition the plurality of interconnected cells into separate disjoint assemblies of the processors in which subexpressions can be evaluated, and input/output means for entering applicative expressions into the cells and for removing results from the cells after evaluations of the applicative expressions.

The invention also includes a method for parallel evaluation of applicative expressions formed from groups of subexpressions in a network of processors wherein the groups of subexpressions are separated by syntactic markers, the method including the steps of entering information into a first group of cells, each cell being adapted to contain at least one symbol of an applicative expression; partitioning the network of processors into one or more disjoint assemblies of processors under control of information contained in the first group of cells; executing an executable subexpression in each disjoint assembly containing an executable subexpression; determining whether further executable subexpressions reside in the first group of cells; repeating the partitioning step in accordance with information contained in the first group of cells after the executing step if further executable subexpressions reside in the first group of cells and removing results from the first group of cells.

C. Features and Advantages of the Invention

It is a primary feature of the present invention that an information handling system architecture capable of directly executing a predetermined class of applicative languages in which parallel processing capabilities of a number of cellular processors may be utilized to maximum advantage to improve system throughput.

The network of processors according to the present invention directly interprets a high level applicative language and efficiently executes problems in the high level language accommodating unbounded parallelism permitted by applicative languages in any single user program.

It is another feature of the present invention that an information handling system according to the present invention accommodates unbounded parallelism which permits execution of many user programs simultaneously.

It is a primary advantage of the present invention, that execution of one or more user programs is accomplished simultaneously including the simultaneous reduction of a number of expressions into subexpressions which are simultaneously evaluated, thus greatly enhancing the speed of execution and achieving significant increases in throughput of an information handling system according to the present invention.

It is another advantage of the present invention that the cellular nature of the processor results in lower design cost of cells, lower cost of replacement, reduced interconnection costs and most significantly, reduction in the cost of programming the network.

These and other objects, features and advantages of the present invention will become apparent by reference to the following drawings and detailed description of a preferred embodiment of the invention.

III. BRIEF DESCRIPTION OF THE DRAWING

FIG. 3b is a schematic representation of a reduction showing an example of a primitive operator according to the present invention shown in the tree form after a reduction.

FIG. 4a is a schematic representation of a reduction showing an example of a primitive operator according to the present invention in internal representation before a reduction.

FIG. 4b is a schematic representation of a reduction showing an example of a primitive operator according to the present invention in internal representation after a reduction.

FIG. 5a is a schematic representation of a reduction showing a second example of a primitive operator according to the present invention in internal representation before a reduction.

FIG. 5b is a schematic representation of a reduction showing a second example of a primitive operator according to the present invention in internal representation after a reduction.

FIG. 6a is a schematic representation of a reduction showing a third example of a primitive operator according to the present invention shown in tree representation before a reduction.

FIG. 6b is a schematic representation of a reduction showing a third example of a primitive operator according to the present invention shown in tree representation after a reduction.

FIG. 7a is a schematic representation of a reduction showing a third example of a primitive operator according to the present invention shown in internal representation before a reduction.

FIG. 7b is a schematic representation of a reduction showing a third example of a primitive operator according to the present invention shown in internal representation after a reduction.

FIG. 8 is a schematic representation of an interconnection of cellular processors according to the present invention.

FIG. 15a is a schematic block diagram of a processor as shown in FIG. 15.

FIG. 16 is a schematic representation of the processing to be performed in L cells to execute the reduction shown in FIGS. 3 and 4 above.

FIG. 17 shows a microprogram for execution of the primitive operator AL.

FIG. 18 shows a microprogram for execution of the primitive operator AND.

FIG. 19 shows a microprogram for execution of the primitive operator AA.

FIG. 20 a representation of the contents of registers in a L cell for a sample microinstruction.

Figure 21:
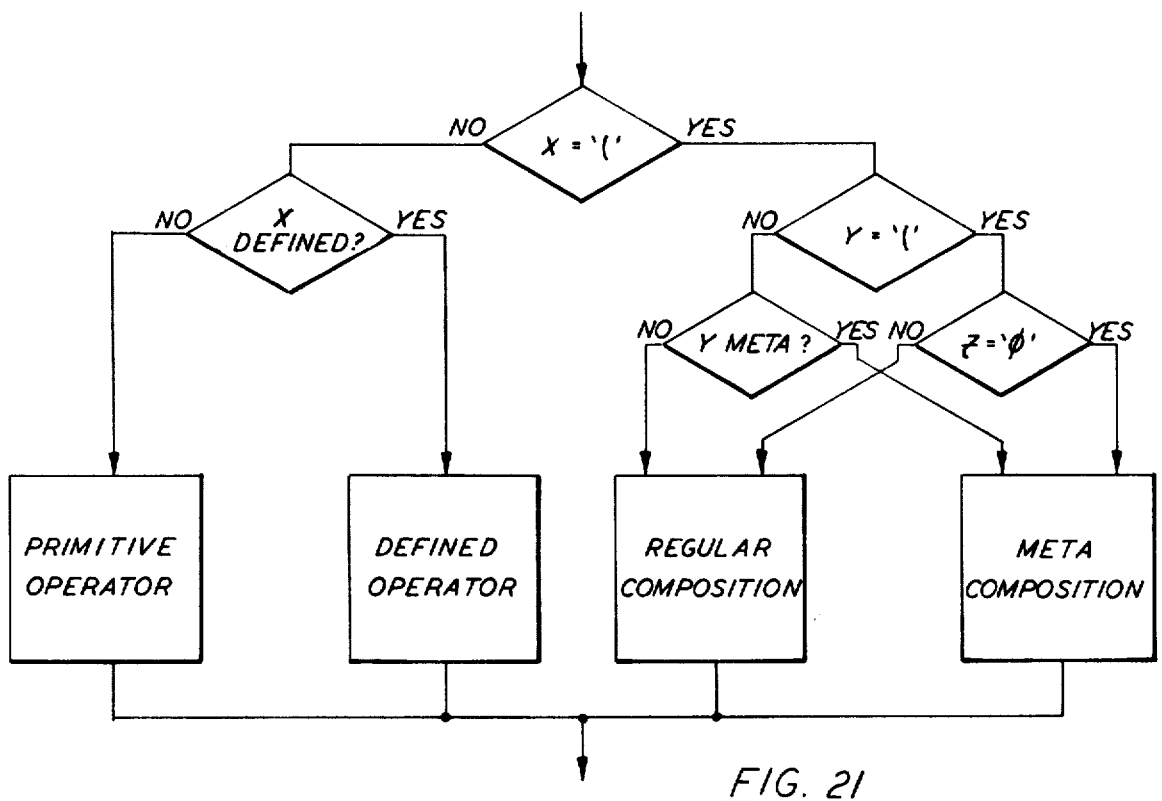

FIG. 21 is a flow chart showing how an operator expression is to be interpreted according to the present invention.

FIG. 22 which comprises FIGS. 22a-22h partitioning of T cell with accordance with upward flow of information from other cells either T or L in a tree structure of processors according to the present invention.

Figure 23:
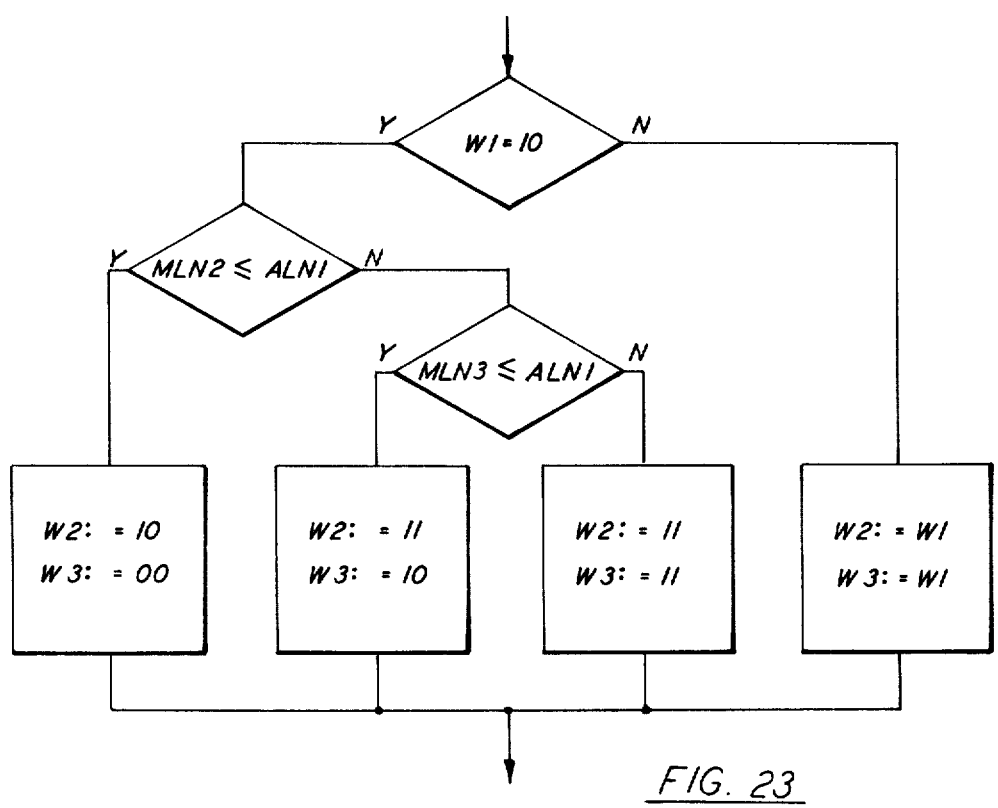

FIG. 23 shows an algorithm in the flow chart form for computing a characterization code W which characterizes a node of an active area.

Figure 24:
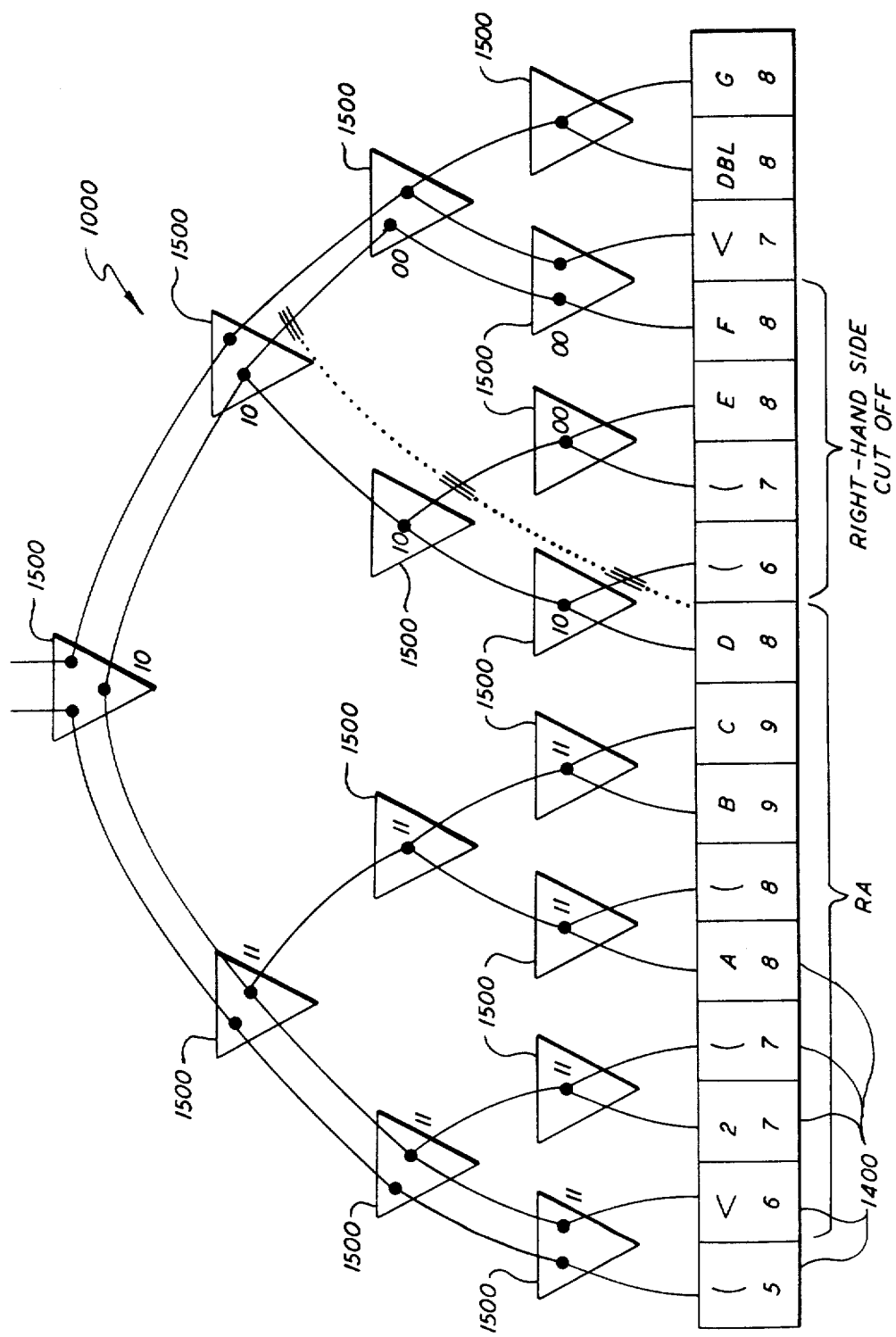

FIG. 24 shows a tree structure of processors according to the present invention in which means or locating the right end of an RA or transforming an area into an active area.

Figure 25:
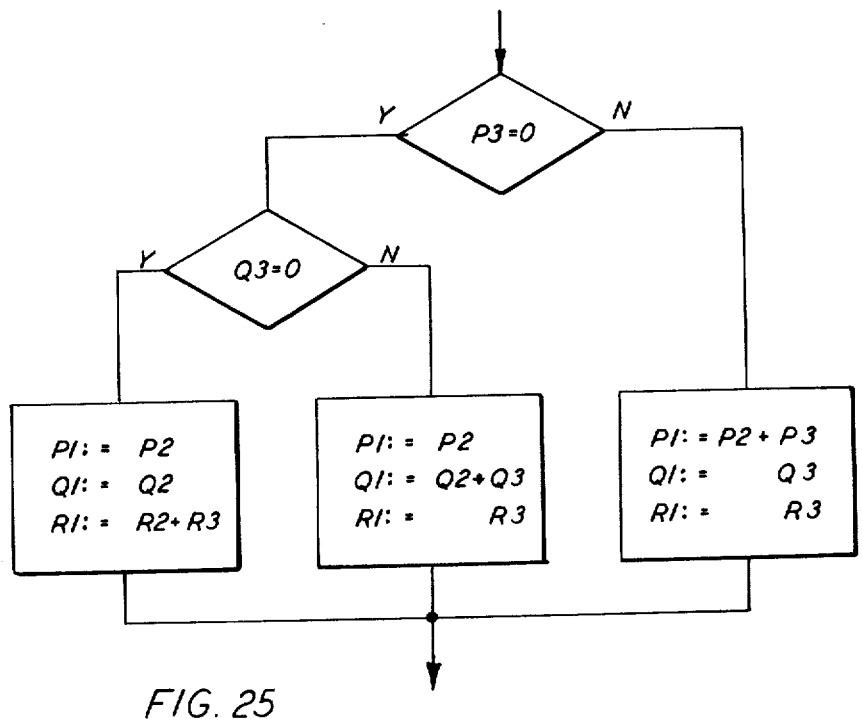

FIG. 25 shows an algorithm in the flow chart form for computing the directory.

Figure 26:
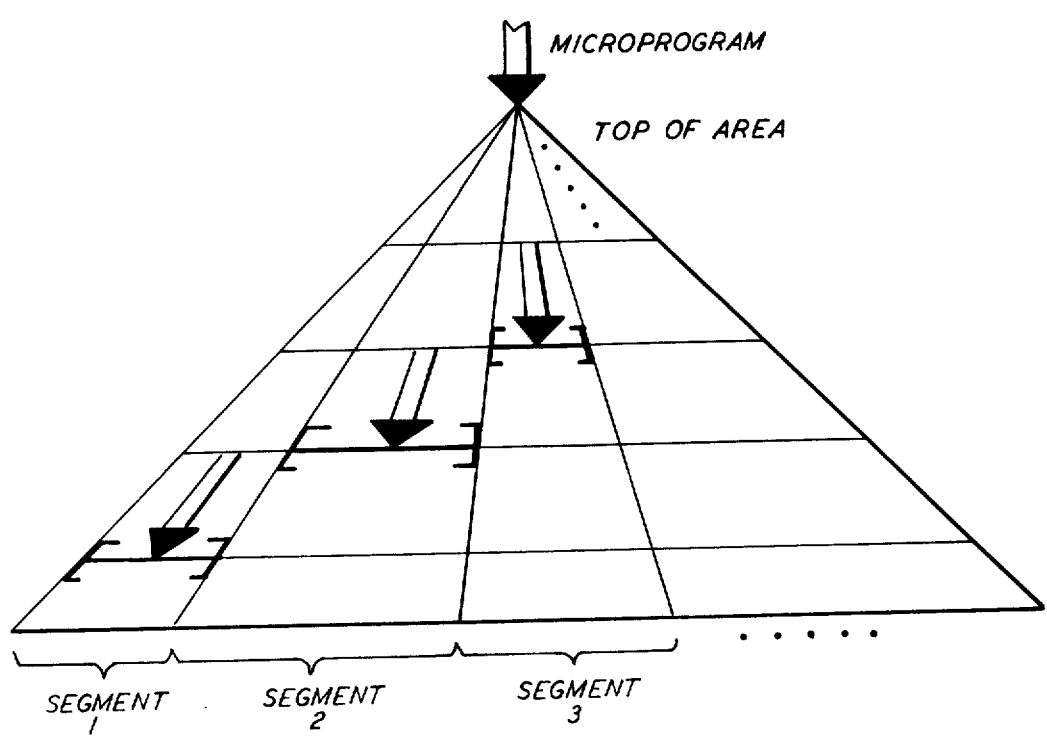

FIG. 26 is a schematic representation of a process of distributing segments of microprograms inside an active area.

Figure 27:
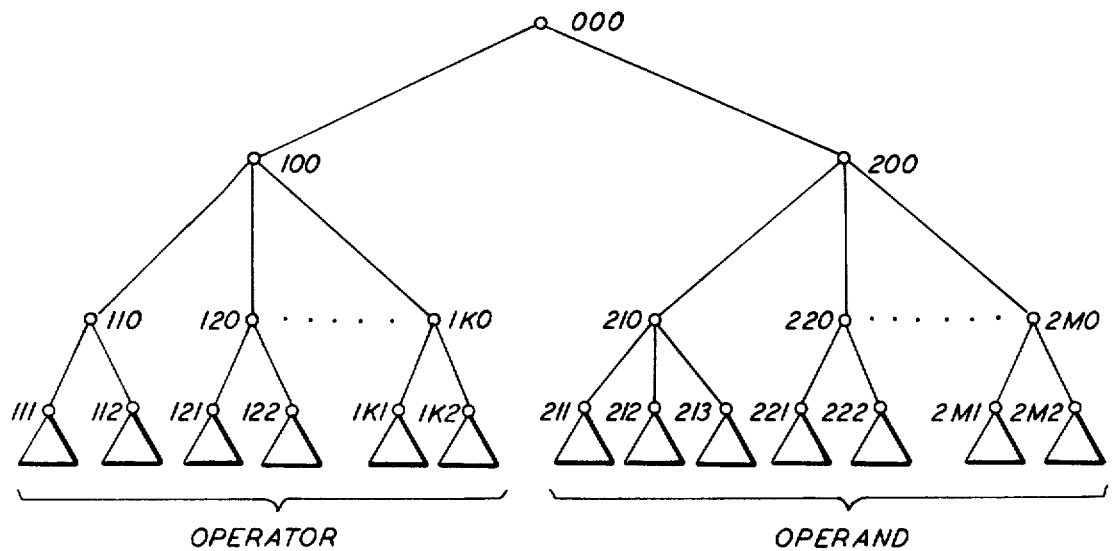

FIG. 27 is a tree representation of identifying symbols which identify nodes of an RA at the top levels of an active area.

Figure 28:
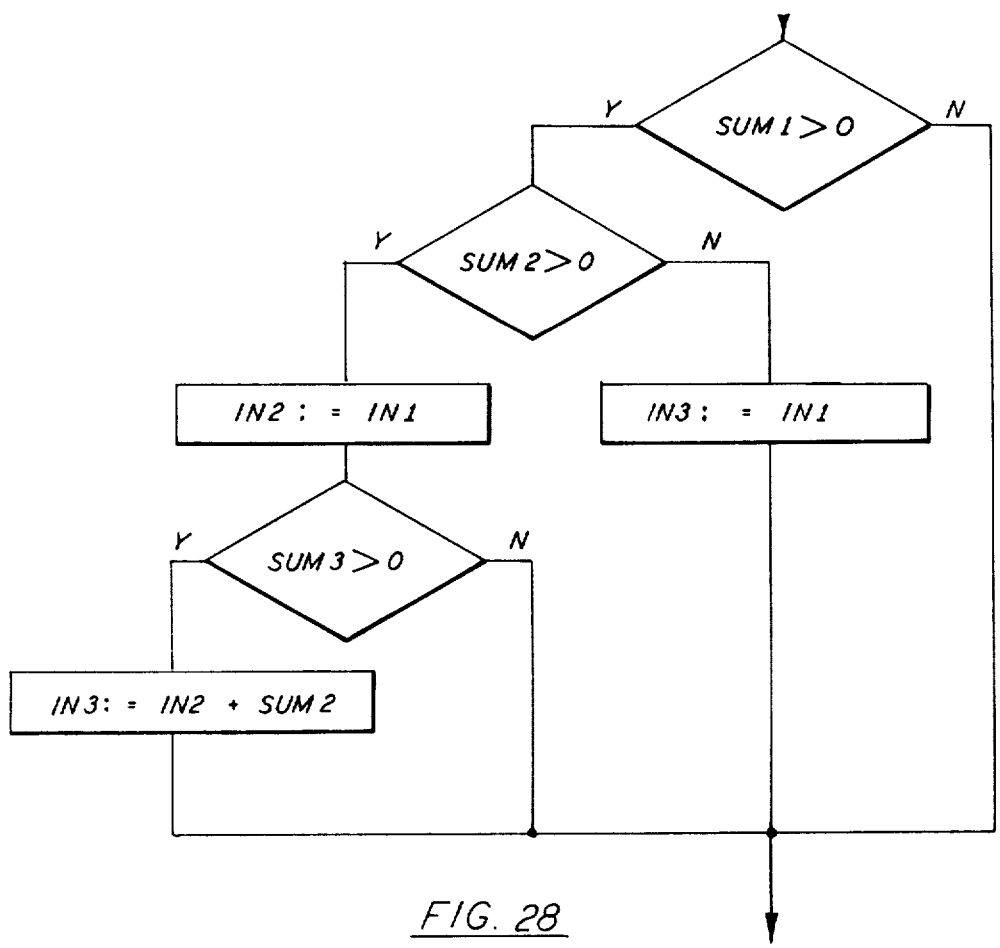

FIG. 28 is a flow chart representation of an algorithm according to the present invention for computing an index (IN) in a node of an active area.

Figure 29:
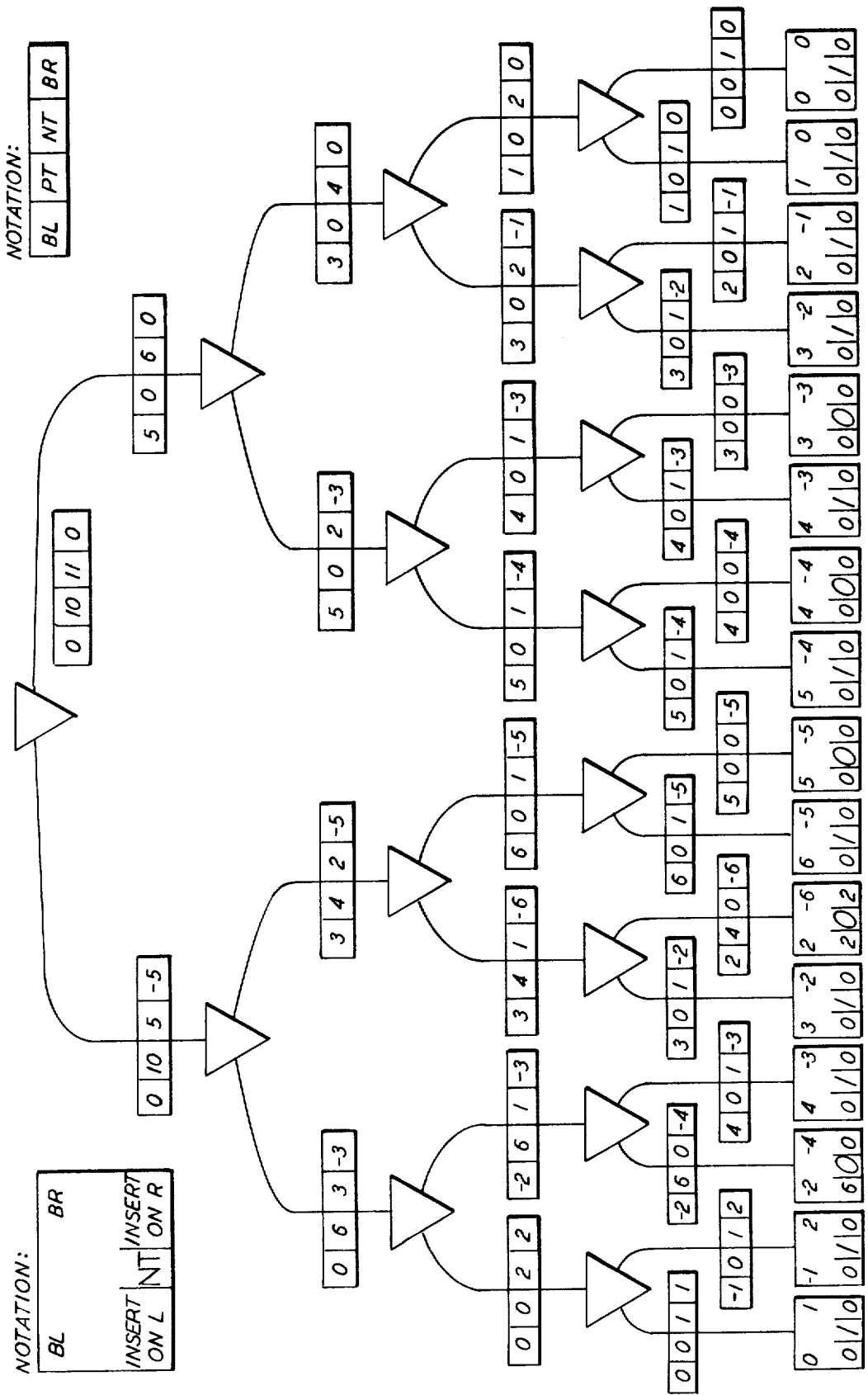

FIG. 29 shows an example of the computation of specification for storage management according to the present invention.

Figure 30:
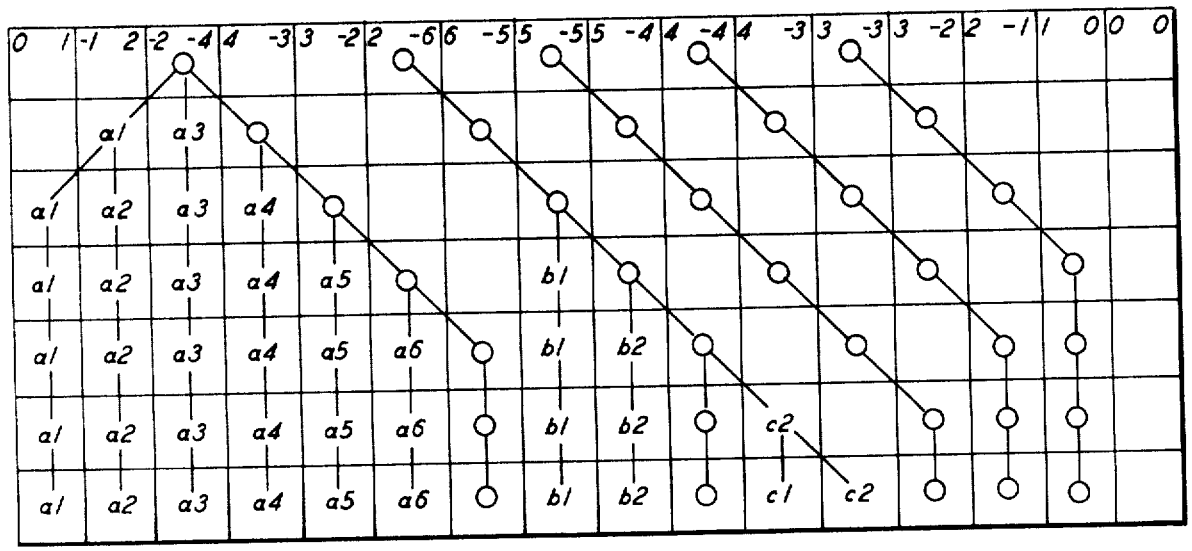

FIG. 30 is a chart showing the contents of a number of cells in L during storage management at seven instants on time.

Figure 31:
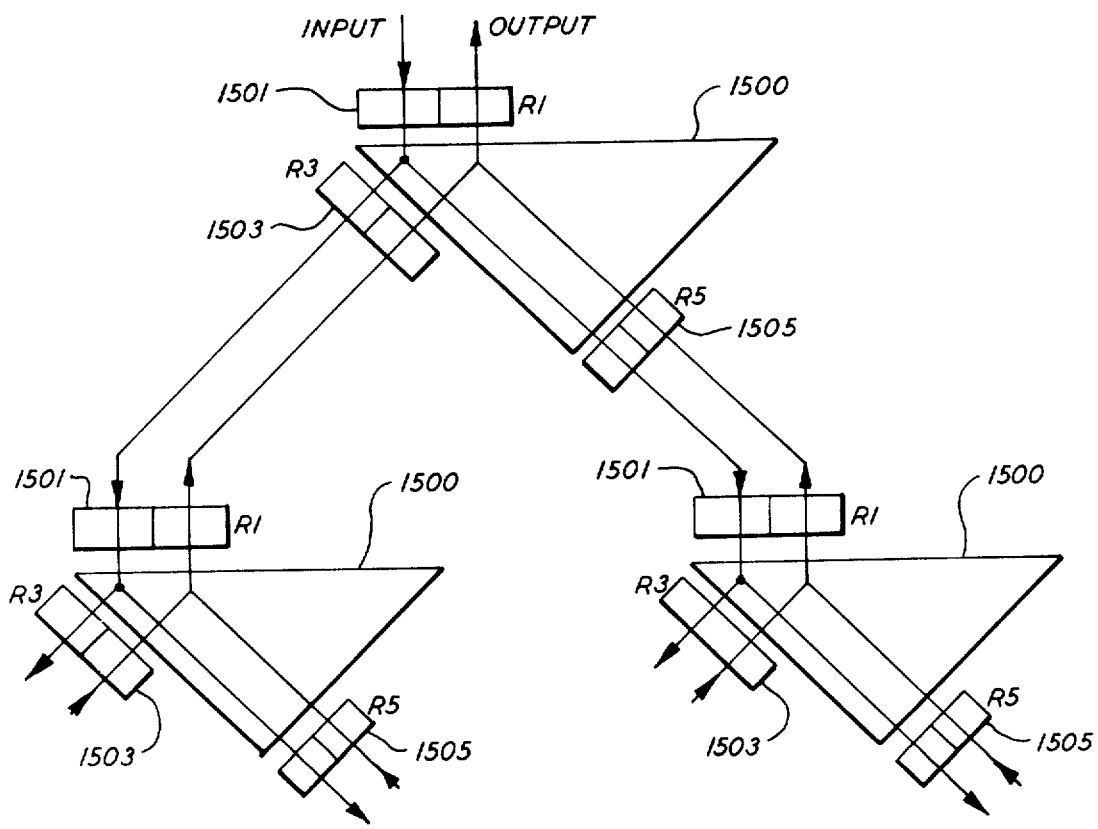

FIG. 31 is a schematic representation of a portion of a processor according to the present invention showing input and output channels in the form of a binary tree.

IV. DETAILED DESCRIPTION OF A PREFERRED EMBODIMENT OF THE INVENTION

A. Computational Requirements of Applicative Languages

Before describing how the information handling system operates according to the present invention, its function will be explained. That, however, can be done only after describing how the syntactic and semantic aspects of applicative languages are represented in the processor, because this representation determines, to a large extent, the capabilities the processor must have in order to act as an interpreter for applicative languages.

1. Representation of Syntactic Aspects

Expressions will be represented as linear strings of symbols, derived from the representation described in Section I. B. as follows: since any well-formed expression of an applicative language is obtained by nesting sequences and applications in each other, we can associate a nesting level with each symbol of an expression; we shall store the nesting level with each symbol, and then eliminate all closing brackets—) and —from the source text for they have become superfluous. This representation corresponds to the symbol sequence obtained by a preorder traversal of the natural tree representation of the original source text, in which the root of each nontrivial sub-tree is labelled with (or <.

The internal representation of the processor is finally obtained by placing pairs of symbols, each consisting of a program text symbol and its nesting level, into a linear array of identical hardware cells, one pair per cell, preserving the order to the program text symbols from left to right. (See FIG. 1 and 2). As a result of placing at most one program text symbol into a cell, the need for explicit separators between symbols vanishes, because now the cell boundaries perform this function. We shall always assume that there is a sufficient number of cells available to hold our symbols; if there are more than the required number of cells, then some of them will be left empty. From the point of view of the representation, the number and location of these empty cells relative to the symbols of the program text is of no consequence; the result of the reduction is not influenced by the empty cells, although the time needed to complete the reduction might be.

Figure 1:
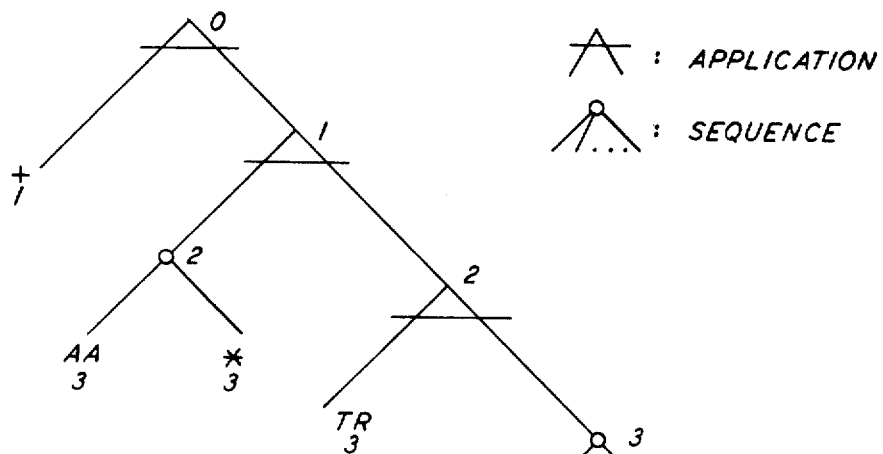
FIG. 1 is a schematic representation of an expression in tree form according to an embodiment of the present invention.
Figure 2:
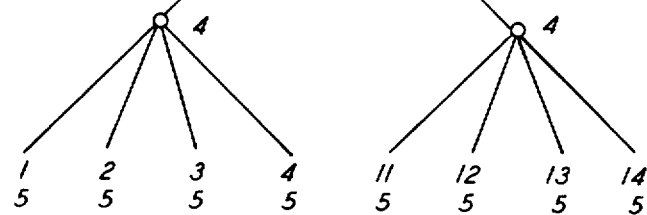
FIG. 2 is an schematic representation of an expression in internal representation according to an embodiment of the present invention.

As an example, consider one of the intermediate expressions that appeared in the example given in Section I. B.: $< + <(AA,*), <TR, ((1,2,3,4), (11,12,13,14))>>>$. The tree representation of this expression is shown in FIG. 1, which also shows the (nesting) level number of every symbol. FIG. 2 shows the internal representation of the same expression.

2. Representation of the Semantic Aspects of Inner Most Application

The semantics of an applicative language is determined by a set of rules prescribing how all the possible reductions should be performed. These include rules specifying the effect of each primitive operator, and rules to decompose composite (regular and meta) operators.

By examining what forms these rules take when using our chosen internal representation for expressions, we will be able to see what kinds of computations the processor will have to be able to perform.

a. Description of Primitive Operators

An applicative language may have a large number of primitives, but the computational requirements of all of them can be classified into three easily distinguishable categories. They will be explained with the help of the following operators:

AL (Apply to Left element)

AL is a meta operator, and its effect is the following:
$<(AL,f), (y1, y2 \ldots, yn)> \rightarrow$
$(<f, y1>, y2, \ldots, yn)$, and if the operand is not in the required form, the result is undefined. Here the underlined symbols are metalinguistic variables, and they stand for arbitrary constant expressions, i.e., expressions containing no applications. The arrow→is used to denote that reducing the expression on the left yields the expressions on the right.

Figure 3A:
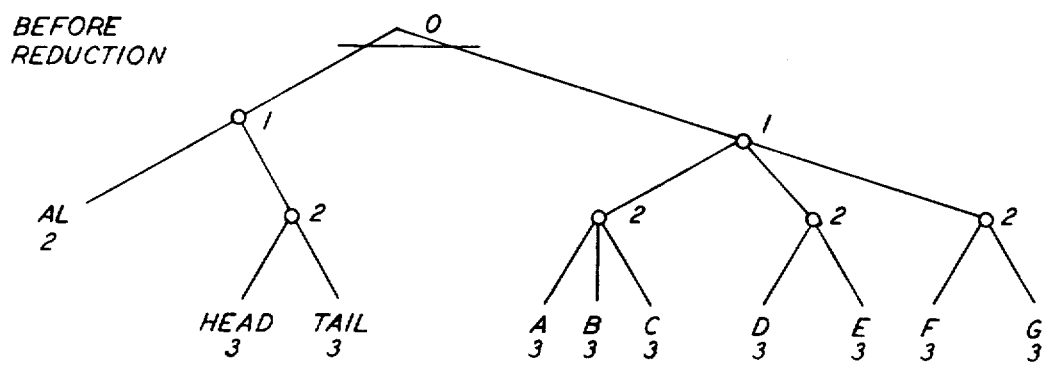
FIG. 3a is a schematic representation of a reduction showing an example of a primitive operator according to the present invention shown in tree form before a reduction.

FIG. 3 shows the effect of (AL, (HEAD, TAIL) on a particular three-element sequence using tree representation. As the definition prescribes it, (HEAD, TAIL) is applied to the leftmost element of the sequence, the rest of the sequence is left alone.

FIG. 4 depicts the same reduction using the internal representation, again showing the program text first before, then after the reduction. Examination of the cells reveals that one of the following things has happened to each one of the symbol - nesting level pairs: the symbol only is rewritten (as in cell 2), the level number only is rewritten (as in cell 16), both symbol and level number are rewritten (as in cell 5), or no change (as in cells 1 and 14).

The processing requirements of this primitive will be called type A requirements, and they are characterized by the following: (1) the result expression can be produced in the cells that held the original reducible application, i.e., there is no need for additional cells, (2) the processing activities that are to be applied to any symbol of the original RA are known before execution begins, hence if prescription for these activities is placed into the cells before execution begins, they can be performed independently of each other, in any order (possibly simultaneously), and there is no need for any communication between these cells during execution (the conclusion is independent of the expressions which replace the metalinguistic variables of the definition, because the expressions f and y1 are left intact, and the only change to expressions y2 through yn is their being moved up the tree by one level).

AND

AND is a regular operator, and its effect is defined as follows:
$<AND, (x, y)> \rightarrow z$,
where x and y are expected to be atomic symbols, either T (true) or F (false). If both x and y have the value T, then the result z is T; if both of them have Boolean values, but at least one of them is F, then the result is F, and in every other case the result is undefined.

FIG. 5 shows an example of the application of AND to (T,F) in internal representation. (Because of the simplicity of this example, we skip the tree representation.) Although the processing requirements of this primitive include some type A processing (for example, the symbol AND and its level number can be erased irrespective of the operand expression), there are some new elements also. They are included in the following, which we call type B requirements: (1) the result expression can be produced in the cells that held the original reducible application, i.e., there is no need for additional cells, (2) at least some of the processing activities are data dependent, and as a consequence, there is a need for communication at least among some of the cells during execution, and also there are certain timing constraints. (In our example, the two components of the operand determine whether to produce F or T as the result, and this result cannot be produced in cell 2 before bringing together the contents of cells 8 and 11.)

AA (Apply to All elements) AA is a meta operator, and its effect is the following:

$<(AA, f), (y1, y2, \ldots, yn)> \rightarrow$
$(<f, y1>, <f, y2>, \ldots, <f, yn>)$.

and if the operand is not in the required form, the result is undefined $\perp$. FIG. 6 shows the effect of (AA,*) on a particular four-element sequence using tree representation. The same reduction is depicted in FIG. 7 using internal representation.

The processing requirements of this primitive are called type C requirements, and they are characterized by the following property: the result expression does not fit into the cells that held the original reducible application, hence there is a need for additional cells.

Since the number of insertions, and the length of the expressions to be inserted are not generally known before execution begins, a complex rearrangement of the whole RA may be necessary, the details of which must be worked out at run-time. (For example, with AA the number of insertions is n − 1, where n is the length of the operand. In FIG. 7 there are three insertions, and each insertion contains the symbols < and *.) Making room for expressions to be inserted (called storage management, see Section B. 6. F.) is possible the length of any expression to be inserted is known at all the places of insertion (indicated with arrows in FIG. 7).

b. Defined Operators

Whenever an atomic symbol for which a definition exists gets into the operator position of a reducible application, it must be replaced by its definition. Since a nontrivial definition contains more than one symbol, replacing a defined symbol by its definition has type C processing requirements. It should be noted that definitions must exist before execution begins and cannot be created at runtime.

c. Composite Operators

When the operator of a reducible application is composite (i.e., a sequence), the way in which the evaluation proceeds depends on whether the first element of the sequence is regular or meta. If the first element of the sequence is an atomic symbol, then whether it is regular or meta is part of its definition. If the first element of the sequence is a sequence, then it is meta if its first element is $\phi$, and otherwise it is regular.

1. Regular Composition

If the first element of a composite operator is regular, we decompose it with the help of the following rule, called regular composition:

$<(c1, c2, \ldots, cn), d< \rightarrow >c1, >(c2, c3, \ldots, cn), d>>$

The above reduction rule reveals that the processing requirements of regular composition can be characterized as type C, since we have to create two new symbols between c1 and c2.

2. Meta Composition

If the first element of a composite operator is meta, it is decomposed with the help of the following rule, called meta composition: $<(c1, c2, \ldots, cn), d> \rightarrow <c1, ((c1, c2, \ldots, cn), d)>$. Since c1 (whatever expression it is) must be duplicated, the processing requirements are to be classified as type C. (In fact, if c1 happens to be a primitive meta operator, there is no need to go through this step: this is demonstrated in FIGS. 3 and 6 with the meta operators AL and AA.)

3. Order to Evaluation

The definition of reduction languages allows the reduction of innermost applications to take place in any order, owing to the so-called Church-Rosser property of these languages. Since innermost applications are disjoint in our chosen internal representation, this representation allows all innermost applications to be reduced concurrently. This is because the outcome of the reduction is determined solely by the operator and operand expressions, and nothing from the rest of the program text can influence it.

4. Locating Innermost Applications

Before processing of innermost applications can take place, they must be located in the program text. This process is somewhat complicated by the fact that there is no bound on either the number of innermost applications that may exist simultaneously in the program text, or on the length of an innermost application.

An application symbol whose level number is i is the left end of an innermost application if (1) it is the rightmost application symbol, or (2) the next application symbol to its right has a level number less than or equal to i, or (3) there exists a symbol with level number less than or equal to i between the application symbol and the next application symbol to its right.

If an application symbol with level number i is known to be the left end of an innermost application, then the entire application consists of the application symbol itself and the sequence of contiguous symbols to its right whose level numbers are greater than i.

B. Description of Network of Processors

1. Interconnection Pattern of Cells

An architecture will now be described in conjunction with the drawing which will include description of an apparatus and a method for evaluating program expressions in applicative languages.

Referring now to FIG. 8, a block diagram of a network of cellular processors according to the present invention is shown. FIG. 8 shows that the processor 1000 is a cellular network containing two kinds of cells interconnected in a highly regular manner. Cells 1400 form a linear array (they are indicated by rectangles in the diagram), and they normally hold the program text as described in Section IV. A. 1. Cells 1500 form a full binary tree (they are indicated by triangles in the diagram), and they perform processing functions, act as a routing network, etc. The linear array of cells 1400 will be referred to as L, and the tree network, as T. Throughout this description the root cell of T is assumed to act as the I/O port of the processor (See section B. 7.).

However, it must be understood that the input/output may be performed directly on the cells 1400 of L by a parallel transfer which transfers into each cell 1400 of L, the appropriate symbol of the program text.

Since L holds the program text one symbol per cell, a network of practical size with comprise a large number of cells. Because of this, we note here an important and very attractive property such networks have: the total number of cells in the network is a linear function of the length of L. More precisely, if n is the height of the tree of cells, then the length of L is $2^{}n$, and the number of cells in T is $2^{}n-1$, so the total amount of hardware is almost exactly $2^{**}n(l+t)$, where 1 and t represent the amounts of hardware built into a single cell of L and T, respectively.

2. The Partitioned Processor

A prerequisite of simultaneously reducing all reducible applications (hereinafter RA's) is to guarantee that different RA's are not able to interfere with each other. One way to achieve this is to make sure that different RA's are processed in disjoint portions of T. (These disjoint portions of T will comprise disjoint assemblies of processors and interconnections, as described below.)

We will describe a processing mechanism in which each RA "sees" a binary tree above it, which processes the RA as if it were alone in the processor. The scheme we describe requires that some cells of T serve more than one RA simultaneously. One way to accomplish this is to make it possible for the hardware of the cells of T to be divided into parts (in a way determined by the contents of L), so that when a cell of T serves more than one RA, each RA uses a different part. The process and the result of separating a cell of T into parts will be called the partitioning of that cell. The process and the result of partitioning all the cells of T is called a partitioning of the processor.

In this section we describe, with the help of a symbolic notation, what the partitioned processor is like. Later, in Section B. 6. a., we present some of the details of the process of partitioning.

At the core of the partitioning process is the execution of the algorithm of Section A. 4., done simultaneously for all applications. There are two steps in this process: (1) locating left ends of applications (as described in Section A. 4.) and subsequently dividing the processor into so-called areas; (2) locating right ends of innermost applications (as described in Section A. 4.), and subsequently transforming some of the areas into so-called active areas.

First we describe the processor as partitioned into areas. Assume that we start out with a representation of the processor as shown in FIG. 8. We modify it by erasing all connections shown in FIG. 8, and place symbols of the reduction language program into cells 1400 of L. In this symbolic notation an area will be a binary tree whose leaves are in cells 1400 of L (there is exactly one such leaf in each cell 1400 of L whether that cell 1400 holds a symbol of the reduction program or not), and whose nodes which are not leaves are in cells 1500 of T. There will be a distinct area associated with the leftmost cell 1400 of L and each < symbol not in the leftmost cell 1400 of L.

The following terminology will be used. The index of a cell 1400 of L is an integer indicating its position in L from left to right. Let $i(1)=1$, and let $i(2), \ldots, 1(q)$ be the indices of cells 1400 of L (other than the leftmost one) holding the symbol <, with $i(m)<i(n)$, whenever $m<n$.

Depending on the value of j, the jth area is the smallest tree such that for $1<j<q$
 (1) the leaves of the tree in the cells of L indexed from $i(j)$ to $i(j-1)-1$,
 (2) the top node (root) of the tree is in the lowest node of T which has both $i(j)-1$ and $i(j+1)$ cells of L as descendants, for $j=1$
 (1) the leaves of the tree are in the cells of L indexed from $i(1)$ to $i(2)-1$,
 (2) the top node (root) of the tree is in the root of T, for $j=q$
 (1) the leaves of the tree are in the cells of L with indices greater than or equal to $i(q)$,
 (2) the top node (root) of the tree is in the root of T.

Figure 9:
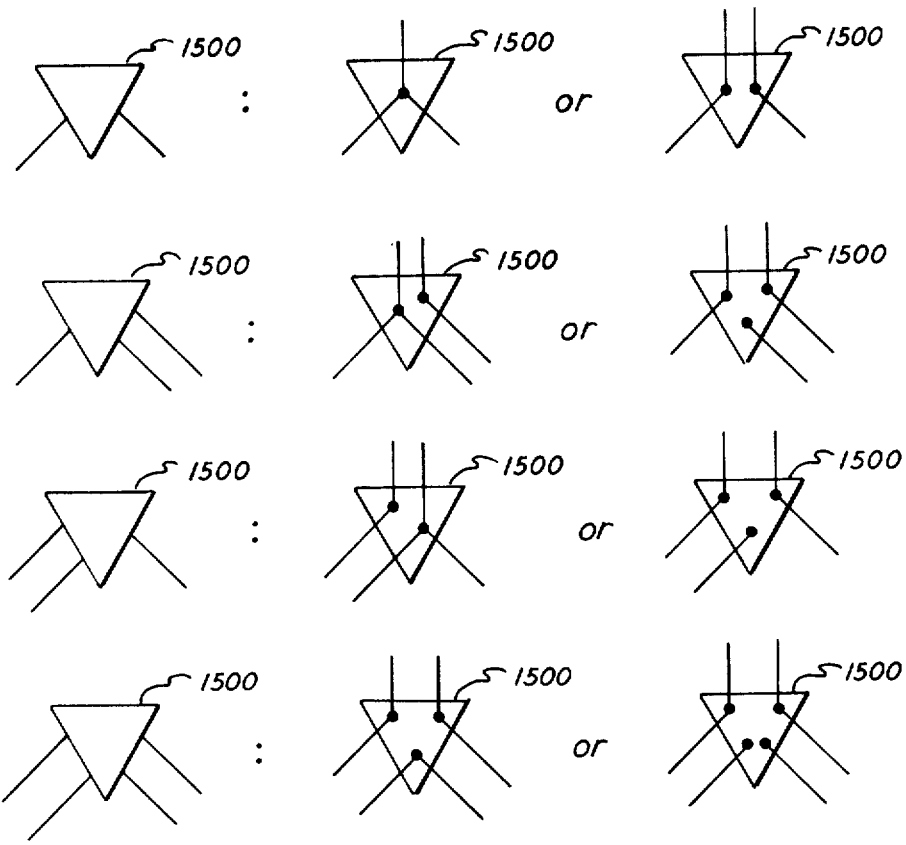
FIG. 9 is a schematic representation of several examples of partitioning a T cell according to the present invention.
Figure 10:
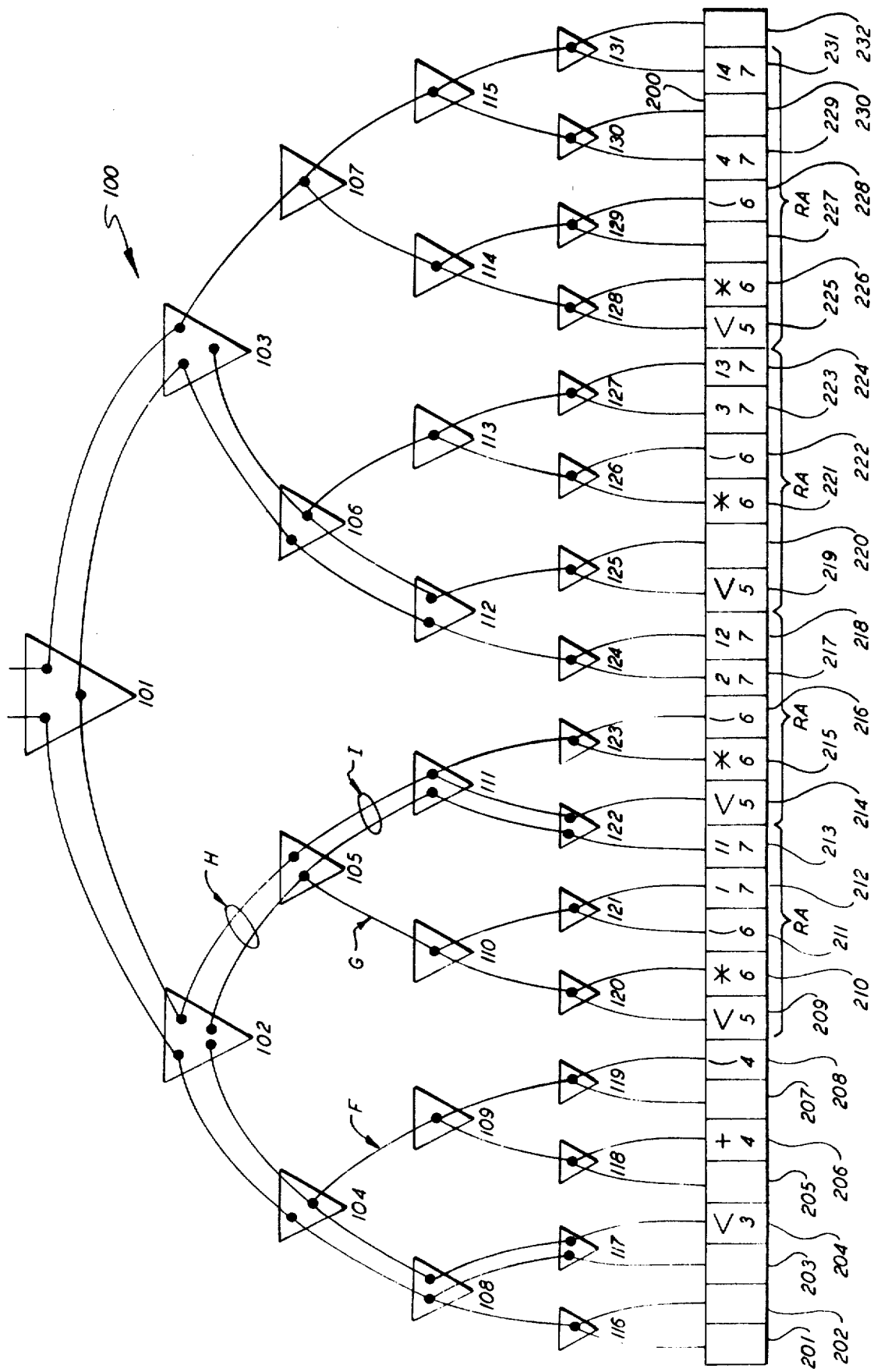
FIG. 10 is a network or processors according to the present invention partitioned into six separate areas.

FIG. 10 shows an example of a partitioned processor containing six areas. Seven of the eight possible partitioning patterns shown in FIG. 9 appear in this example. The elements of the symbolic notation we are using can be interpreted as follows. All branches of areas correspond to communication channels of identical capabilities capable of carrying information both ways simultaneously. Whenever only one branch is shown between two cells, we may assume that the second channel is idle. Each node of an area corresponds to some fixed amount of processing hardware. Whenever a node of an area has two downward branches, the corresponding node hardware may perform processing that is immediately comprehensible in terms of the reduction language program. (Note that a cell of T may hold at most one node with two downward branches.) For example, in FIG. 10, the node with two downward branches in cell 105 will multiply the symbols 1 and 11 in the program text, 2 and 12 will be multiplied in cell 124, 3 and 13 will be multiplied in cell 127, and 4 and 14 will be multiplied in cell 115. Other functions of such nodes, and the role of nodes with one downward branch will be described later. The top cell 101 of the area will serve as its I/O port; the I/O channels with which it connects are not considered here, but will be taken up in Section B. 7.

Finally we note that since the root of an area is in a cell 1500 of T which has among its descendants the cell of L holding the next < symbol on the right (if one exists), all the necessary information can be made available at the root node of each area to determine whether or not the area contains an RA.

Once the processor is divided up into areas, the algorithm to locate RA's is executed at the root of each area. Since the leaves of an area holding an RA contain all cells of L up to the next < symbol or to the right end of L, some of the right-most leaves of this area may hold symbols of the reduction language text that are outside the RA. Locating such leaves, and separating them from the area—thereby transforming the area into an active area—is the second part of the partitioning process. (The active area is obtained by cutting off certain subtrees of the original area. As a result, the active area is a binary tree, too.) In our example in FIG. 10, there are four RA's, but none of them requires this process.

It should be pointed out that partitioning the T cells (a spatial separation) could be replaced by time multiplexing (a temporal separation), leading to a possibly slower, but cheaper implementation of the same system.

3. Organization, States and State Changes

In a global sense the operation of the processor is determined by the applicative language program placed into L 200. (See FIG. 100). Since there are no functions dedicated to cells of T and L, the operation of each cell will be "data-driven", i.e., in response to information received from its neighbours. The activities of cells will be coordinated by endowing each cell of the processor with copies of the same finite-state control, which determine how the cell interprets information received from its neighbours. Whenever a cell of T gets partitioned, each independent part (there are at most four of them, each corresponding to a distinct node of an area) must have its own finite-state control. On the other hand, a cell of L needs only one such control, since it never gets partitioned.

The state of a node of an area will change whenever either its parent or both its children change state. The actual pattern of state changes will be the following: the root cell of T will initiate the process by the nodes contained in it changing their states; as a result, its son cells in T will change state, and these changes, in turn, initiate similar changes on the next lower level of T. When this wave of changes reaches L, the state changes in the cells of L initiate changes in the bottom level of T, which, in turn, cause changes in the next higher level of T, etc.

Figure 11:
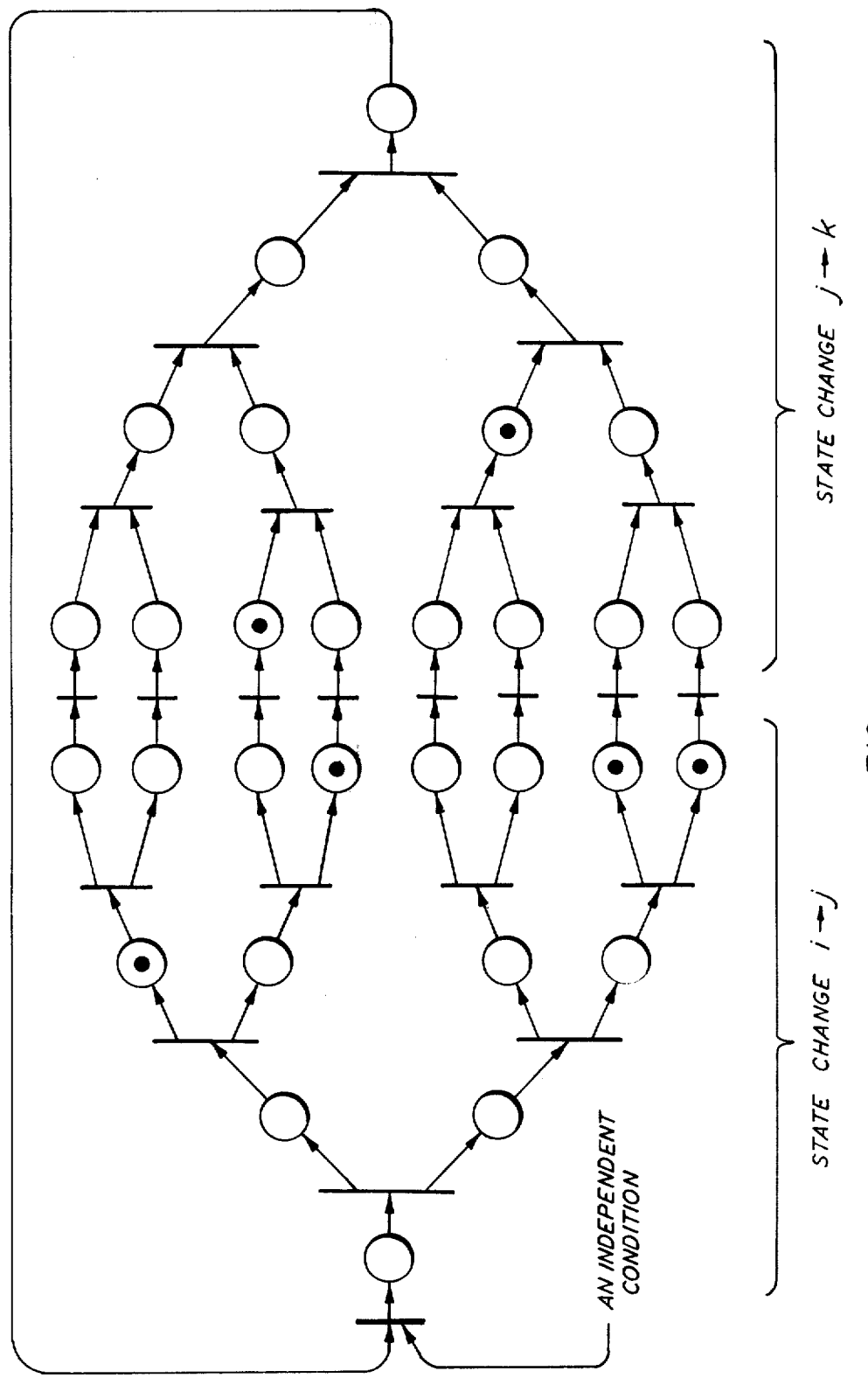
FIG. 11 is a state change diagram representing state changes in a processor according to the present invention containing a single area with eight L cells.

FIG. 11 shows a representation of the state changes for a processor in which L has eight cells, partitioning produced a single area, and hence all the cells go through the same state changes. All conditions (represented by circles) have the following interpretation: "in the given cell state change p→q is taking place." The distribution of tokens in the net (showing the holding of certain conditions) illustrates that these state changes can take place at their own pace, but they always get synchronized in the process of approaching the root cell of T.

Figure 12:
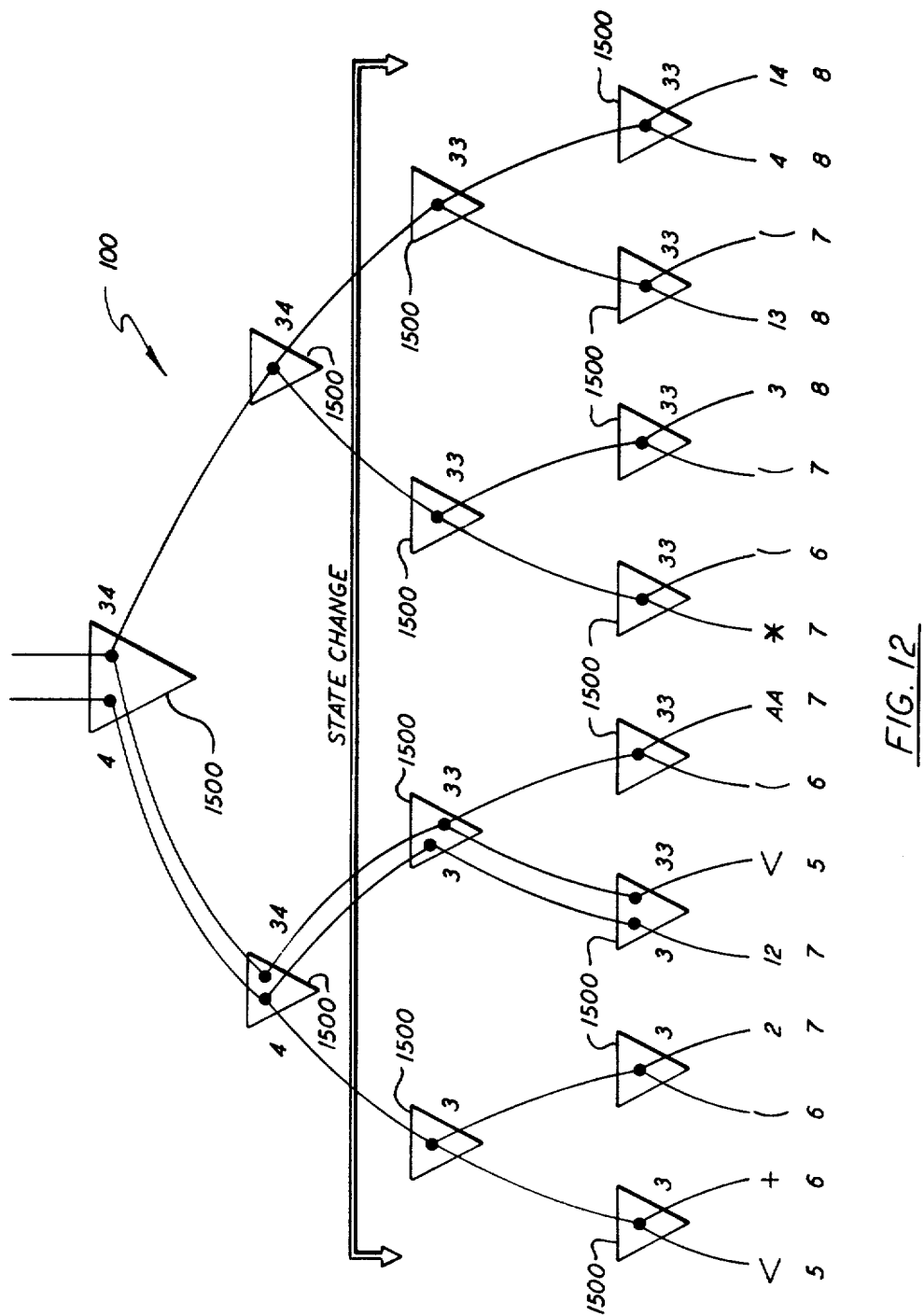
FIG. 12 is a schematic representation of a network of processors according to the present invention at an instant of time during a downward cycle.

In order to simplify our presentation, we shall assume that the state changes take place simultaneously on any level of T. This will allow us to talk about upward and downward cycles, indicating which way the state changes are propagating. FIG. 12 shows a fragment 100 of a processor in the middle of a downward cycle. The cells are partitioned, and four different states—3,33,4, and 34—can be found in the diagram. The diagram illustrates the following point: since the reason for having the finite-state control in the cells is to coordinate related activities in the processor, all nodes of an area go through the same state changes (e.g., in FIG. 12 all nodes of the active area on the left are going through the change 3→4, whereas all nodes of the active area on the right are going through 33→34), and as a result in general no useful purpose is served by talking about the state of the processor as a whole.

Figure 13:
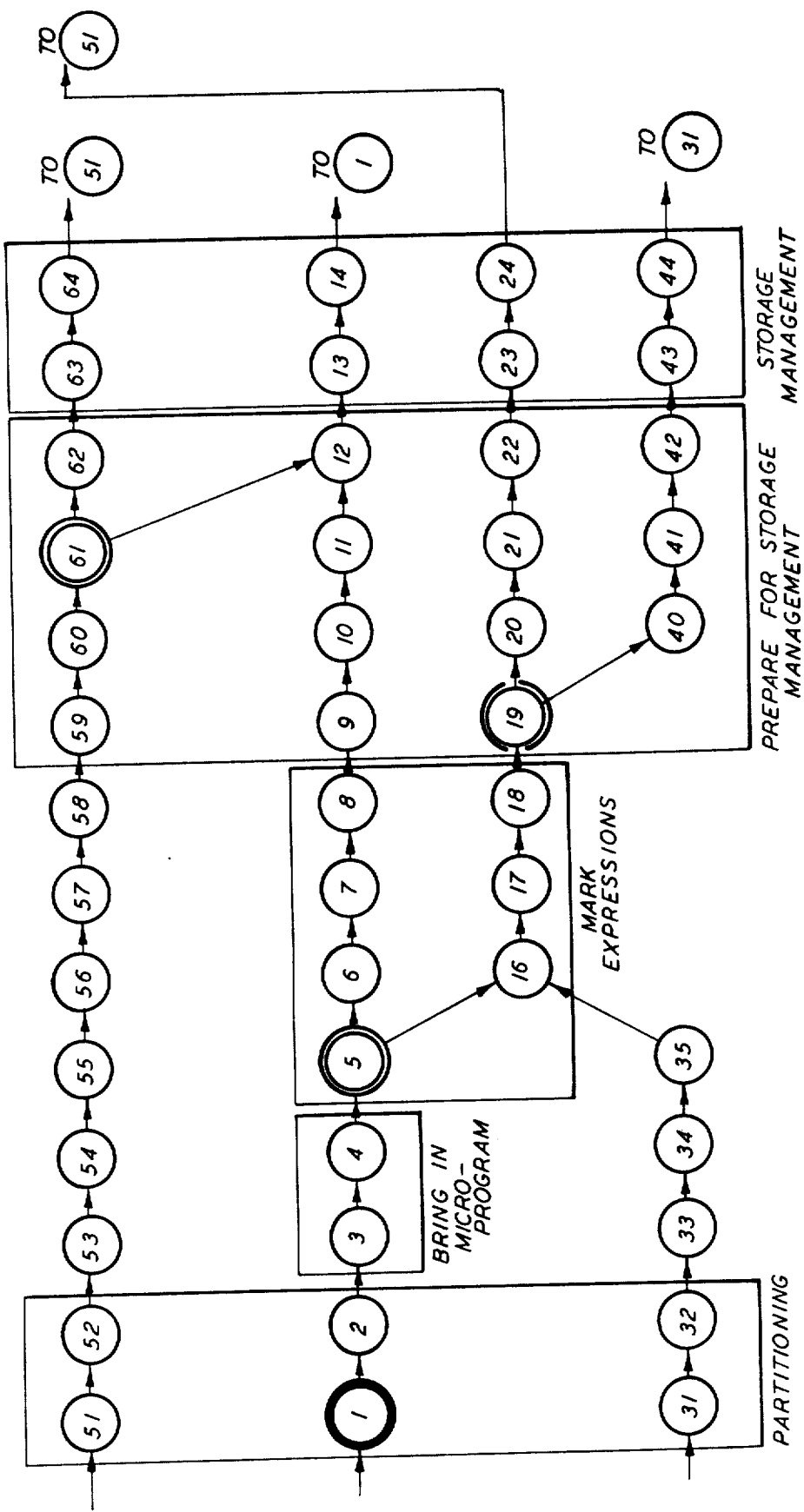
FIG. 13 is a state diagram of a node of an area.

FIG. 13 shows the state diagram of the nodes of areas, (and also that of cells of L) for the processor we are describing. Here only the following observations are made: (1) although different cells (or parts thereof) may be in different states at any moment, we can always say (thanks to our simplifying assumption made above) that all cells (or parts thereof) on the same level of T are in states that are in the same column of the state diagram (for an example see FIG. 12); (2) we shall use the expression $k+i$ to denote all states in a column of the state diagram, where i is the smallest label in the column and k may assume values from 0, 10, 30, and 50, e.g., $k+4$ where $k=0, 30, 50$, $k+7$ where $k=0, 10, 50$, or $k+12$ where $k=0, 10, 30, 50$; (3) odd numbered states are entered in upward cycles, and even numbered states are entered in downward cycles; (4) there are three (specially marked) states in the diagram—states 5, 19, and 61—with more than one successor state; in these states the successors are always chosen deterministically, with the help of conditions that are not visible on the level of the state diagram; (5) in cells of L, the state belongs to the contents of the cell, not to the cell itself—hence the state information moves with the contents of the cell during storage management (See Section B. 6. f. 2); (6) since the state diagram describes the states of the nodes of areas, during state transition $k+14 \to k+1$, when partitioning takes place and hence areas go out of and come into existence, some additional rules are needed: in states $k+14$ each node of each area changes its state to the undefined state, with the exception of the leftmost cell of L and the cells of L holding an < symbol, and these cells of L, in the process of repartitioning the processor, determine the states of the newly formed areas (the state transitions to and from the undefined state are not shown in the state diagram of FIG. 13); (7) when the program text is first placed into L, the state of each symbol in it is 1; (8) the state diagram is cyclic: the successors to states $k+14$ are states $k+1$.

The state diagram specifies the overall organization of the processor. The organization, and hence the state diagram, chosen for description is just one of many possible alternatives; the main criteria in its selection were that it be easy to describe, and still able to illustrate well the advantages of a processor of this kind.

Since it is the state of the node of an area which determines what processing activities that node performs, and the states of the nodes of an area are closely coordinated (all nodes of the area go through the same state change in each upward and downward cycle), the processing activities performed by an area in certain states (or in certain groups' of states) can be classified as fitting one of several global patterns. We choose to distinguish three such patterns, and call them modes of operation.

In modes I and II, information is sent along paths between L and the root cell of T usually inside areas, but possibly also across area boundaries (examples of the latter are partitioning, preparation for storage management, and detecting the end of storage management). In mode III, information is sent only between cells 1400 in L.

Modes I and II are distinguished because they treat information items moving upward differently. In a mode I operation, (1) whenever a node of an area (or a cell of T) receives two information items from below, it produces one information item to be sent up to its parent node; (2) the output item is produced by performing some kind of operation on the two input items, such as adding two numbers (see combining messages, Section B. 6. d.), taking the leftmost three of six arriving items (see partitioning Sections B.6.a.), or the considerably more complex operation of preparing the directory (see Section B.6. b.); (3) since each subtree of the area (or of T) produces a single value, this value can be stored in the root node of that subtree, and can be used to influence a later phase of processing; (4) if the data paths are wide enough, the node of the area (or of T) is able to receive both its inputs in one step, and hence able to produce its output in one step.

In a mode II operation, (1) whenever a node of an area receives two information items from below, it produces two information items to be sent up to its parent node; (2) the two output items are the same as the two output items, and the order in which they appear on the output may or may not be of consequence; (3) the higher up a node is in the area, the larger the number of information items that will pass through it, and as a result, the time required for a mode II operation is data dependent. Because of this queuing phenomenon, and because the size of information items may vary considerabley, the natural way to control a mode II operation is with the help of asynchronous control structures, via ready and acknowledge signals. The mode II operations are: (1) bringing in microprograms; (2) sending messages, data movement, and I/O; (3) preparation for storage management (in states $k+9$ and $k+10$).

Modes I and II also differ in the ways they treat information items moving downward, but these differences are consequences of the primary distinction between them. In a mode I operation, (1) the node of the area (or of T) produces both a left and right output item in response to the one input item, and they may be different, depending on what was left in the node by the previous upward cycle (an example of this is the process of marking expressions—see Section B.6.c.); (2) since during the previous upward cycle the top of the area produced a single item, during the next downward cycle only a single item (not necessarily the same) will be arriving at each cell of L in the area; (3) the processes of moving information up and down in the area do not overlap in time.

In a mode II operation, (1) the node of the area produces two output items in response to the one input item, and they are always identical (the item is being broadcast to each cell of L in the area); (2) every item that passes through the top node of the area is broadcast separately to cells in L, and the latter are free to accept or reject any of the items arriving at them; (3) the processes of moving information up and down in the area overlap in time, and hence each branch of the area must be able to carry information items in both directions simultaneously.

In summary, modes I and II can be compared and contrasted as follows. In a mode I operation, by propagating information upwards in the tree simultaneously from all cells of L, the global situation in L is evaluated and the partial results of this evaluation are stored into the nodes. Next, by propagating information downwards in the tree and by using the partial results stored in the nodes, each cell of L can be influenced separately and differently. In a mode II operation on the other hand, the area functions as a routing, or interconnection, network, and typically delivers information items from L back to L, by passing them through the root node of the area.

Mode III is characterized by the fact that only cells of L participate in the processing, and adjacent cells of L communicate with each other directly. The only mode III operation is storage management (see Section B.6.f.2).

4. Cell Organization

In this section we outline the processing and storage capabilities that a typical cell of L and T must have. When describing certain components of these cells, we shall often refer to details that are explained only in subsequent parts of Section B. Hence, this section can be fully understood only after reading the rest of Section B.

a. L Cells

Figure 14:
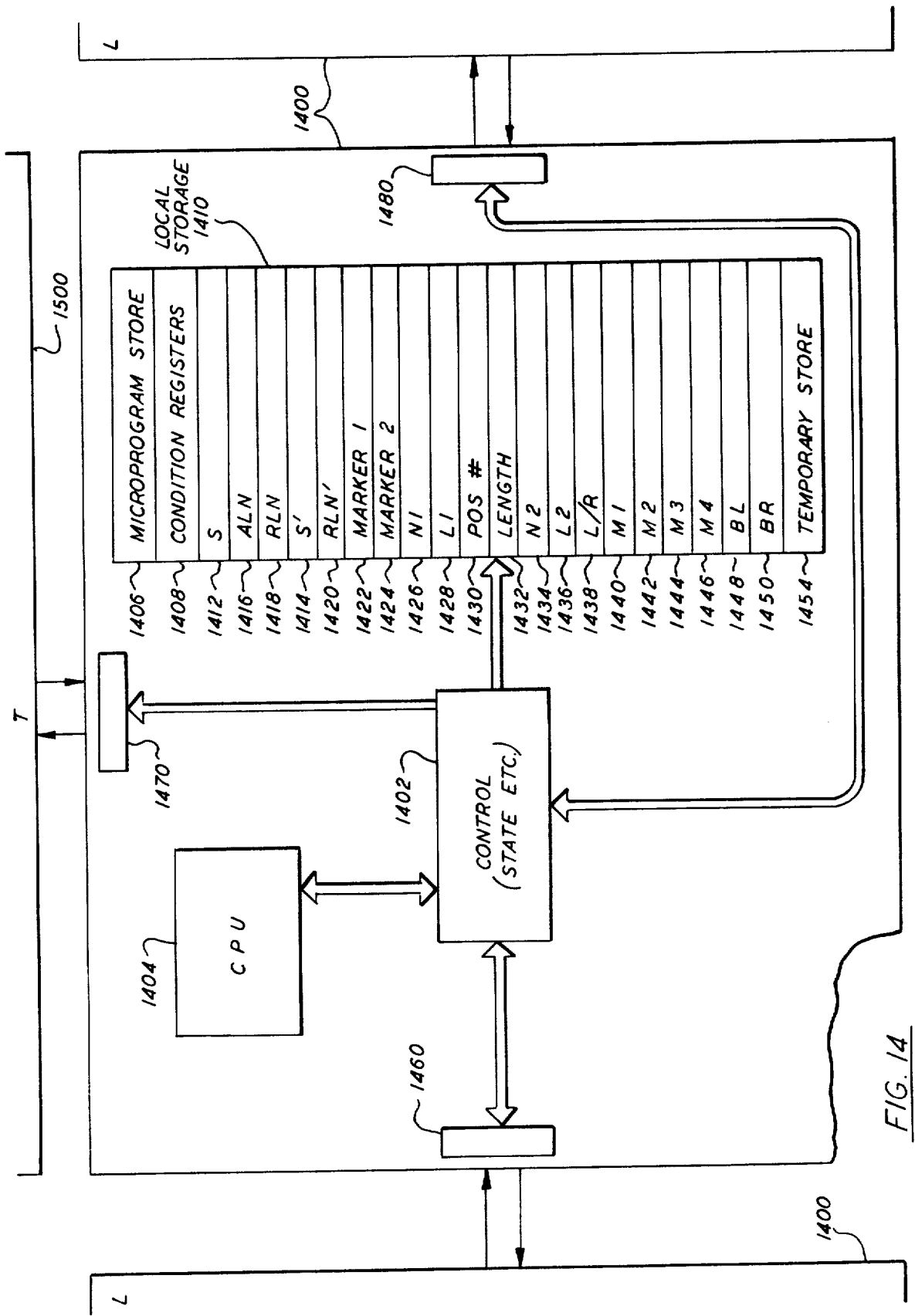
FIG. 14 is a schematic block diagram representation of an L cell.

FIG. 14 shows a cell 1400 of L. The names of registers appearing in FIG. 14 are used in the rest of Section B to explain how the processor operates.

The state control 1402 has the ability to store the current state, and compute the next state corresponding to the state diagram of FIG. 13; this state information belongs to the contents of the cell not to the cell itself.

CPU 1404 has the ability to execute segments of microprograms, and perform processing related to storage management (see Section B.6.f.), which is not explicitly specified in microprograms.

Microprogram store 1406 is capable of storing a certain number of microinstructions. This is necessary because certain microinstructions cannot be executed immediately upon receiving them, since some of their operands are not yet available.

Condition registers 1408 store status information about the contents of the cell; for example, whether the cell is full or empty, and whether the contents of the cell are to move during data movement.

Local storage 1410 contains the following registers:

S 1412 holds a single symbol of the reduction language text.

S' 1414 holds another symbol of the reduction language, with which S 1412 is to be rewritten at the end of processing the RA.

ALN 1416 holds the absolute level number of the symbol of the program text; this is obtained by considering the contents of L as a single expression of the reduction language and assigning to ALN the nesting level of the symbol in question.

RLN register 1418 stores the relative level number of a symbol in an RA. This is obtained by assigning to RLN the nesting level of the symbol with respect to the RA.

BL 1420 stores the value with which RLN 1418 is to be rewritten at the end of processing the RA.

MARKER 1 1422, and MARKER 2 1424, are set by the microprogram and used to mark all symbols of an expression. Whenever a microinstruction "mark with x" is executed in a cell of L, MARKER 1 1422, receives the value "x", and if RLN 1418 has a certain value, MARKER 2 1424, receives "x", too. Symbols of the marked expression are indexed, beginning with one and these index values are placed in N1 1426. The largest index value, which is the total number of symbols in the expression, is placed in L1 1428. When a symbol occurs in a marked expression, the contents of POS#1430 (mnemonic for position number) for each symbol is set as follows: the marked expression is considered a sequence, and all symbols of the expression which is the ith element of this sequence receive the value i in their POS# register 1430. The largest value of POS#, which is the length of this sequence, is placed in register LENGTH 1432 of each symbol. Also, each expression which is an element of the sequence is indexed separately, the index values are placed in N2 1434, and the total number of symbols in the element expression are placed in L2 1436. (N2 and L2 play the same role for the element expressions as N1 and L1 do for the whole marked expression.) The L/R register 1438 holds the value "left" (or "right") if the symbol contained in S 1412 is the leftmost (or rightmost) symbol of one of the elements of a marked sequence.

M1 1440, M2 1442, M3 1444, and M4 1446 are called message registers: send statements generate messages that may have one, two, three, or four components, and on arrival at the cell 1400 of L, they are placed in M1 1440, M2 1442, M3 1444, 76-233 and M4 1446 respectively.

BL 1448 and BR 1450 contain non-negative integers, and are used during storage management; the cell 1400 of L in question will be entered on the left by the contents of BL 1448 cells of L, and on the right by the contents of BR 1450 cells of L.

Of these registers, BL 1448, BR 1450, and state control 1402 are used in every cell 1440 of L; S 1412 and ALN 1416 are used in every occupied cell of L; and all the other registers are used only by occupied cells internal to an RA, or by cells reserved during storage managment. State control 1402 controls the flow of information between the buffer registers 1460, 1470 and 1480 which act to buffer information being transmitted into or out of cell 1400 to local storage 1410, which consists of registers 1406 through 1454 inclusive and to CPU 1404. Buffer register 1470 buffers information being transmitted to and from the T cell 1500 associated with the L cell 1400 under consideration. Buffer register 1460 and 1480 transmit information to and from adjacent L cells 1400 when there are interconnections between cells 1400 in the L array.

The size of the registers 1412 through 1450 in the local storage 1410 of each cell is determined by the size of S and ALN, and by the size of L because (1) RLN need not be any larger than ALN, (2) components of messages may be either symbols of the program text or relative level numbers, and (3) the number of cells in L is a bound on the values that BL 1448, BR 1450, N1 1426, L1 1428, POS# 1430, LENGTH 1432, N2 1434, and L2 1436 have to hold.

The following considerations are relevant to determining the size of S 1412: S must be able to hold (1) syntactic markers, such as (or <, (2) symbols whose meanings are specified by the language definition, such as T (true), F (false), $\phi$, and numbers, (3) names of primitives of the reduction language (each has its effect defined by a microprogram), and (4) symbols to designate user-defined operations (for which a definition must be created before execution begins).

Register ALN 1416 must be able to hold the absolute level number of any symbol of the program text, and consequently the size of ALN 1416 is in a simple relation with the size of the processor. Assume that T 100 is a full binary tree, and the height of the tree network is n, in which case the number of cells in L is $2^{}n$. Assume further, as a worst case, that L contains a single constant expression such that the rightmost cell 1400 of L holds an atomic symbol and all other cells of L hold a sequence symbol. The maximum nesting level in this expression is $2^{}n - 1$, and so ALN must have n bits to accommodate it.

b. T Cells

Figure 15:
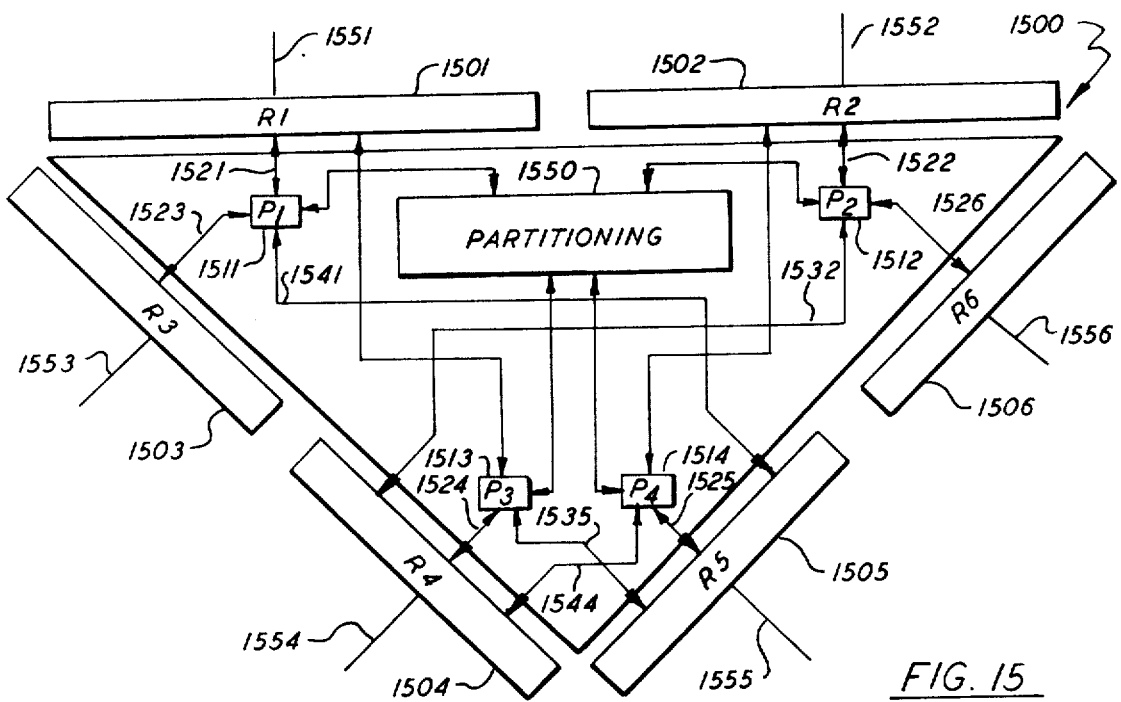
FIG. 15 is a schematic block diagram representation of a T cell

A cell 1500 of T 100 is shown schematically in FIG. 15. The components of this diagram can be explained as follows:

(1) R1 1501 through R6 1506 stand for identical groups of registers. These registers serve two functions, as input and output ports in the process of communicating with other cells 1500, 1400 of T and L and as local storage for P1 1511 through P4 1514.

(2) P1 1511, P2 1512, P3 1513, and P4 1514 are the processing components of the cell 1500; each one may belong to a different area of the processor 1000. All have identical processing capabilities, the same amount of local storage, and identical state control units (similar to state control 1402 in FIG. 14). They must be able to perform the processing required by the internal mechanisms, described at length in the remaining part of Section B.

FIG. 15a shows a block diagram of each processor of T. Each Pn includes an ALU 1562 and a microprogram control unit 1564.

(3) The lines 1521-1526, 1532-1544 connecting the register groups 1501-1506 and the processing components 1511-1514 represent communication channels of identical capabilities, capable of carrying information both ways simultaneously. (Channel width may be selected as required) Not all channels are used all the time: FIG. 22 specifies the eight possible partitioning patterns of the cell. The partitioning control in FIG. 15 determines which partitioning configuration is assumed by the cell 1500.

(4) Information paths 1551, 1552, 1553, 1554, 1555, 1556 originating in R1 1501 and R2 1502 in R3 1503 and R4 1504 and in R5 1505 and R6 1506 lead to the parent node, left son node, and right son node, respectively. Each line represents a communication channel capable of carrying information both ways simultaneously.

In the rest of Section B, the processing activities performed by cells 1500 of T are described with the help of temporaries. Again, we do not show an explicit mapping between these temporaries and the components of T, because many different mappings are possible.

5. Microprogramming Language

In this section we describe a simple language capable to specifying all the computational requirements outlined in Section A. Since it is closer in style to a conventional microprogramming language than to a machine language, we shall refer to it as a microprogramming language.

Type A processing, which we described in Section A, can be performed in cells of L alone, and we choose to implement it by executing suitable microprograms in cells of L. Type B and C processing requirements are more complex, and we implement them by executing suitable microprograms in cells of L, which, in turn, can initiate processing activities in cells of T.

FIG. 16 will help to introduce some terminology. It shows the RA already discussed in the context of the FIG. 4, and it indicates (in plain English) the processing activities that must be performed to bring about the effect of the reduction rule in question.

The totality of processing activities required by an RA, and expressed in the microprogramming language, will be called a microprogram. A microprogram is made up of segments specifying processing required by single symbols (atomic symbols or syntactic markers) or well-formed expressions of the RA. A segment comprises an sequence of microinstructions.

Microprograms specifying the effects of operator expressions reside outside the processor. When a reducible application is located, the appropriate microprogram is sent in via the root cell 101 of T. Section B. 7. describes how it gets from the top of the active area to cells of L holding the reduction language program text. If the RA is well-formed, every symbol of it receives a segment of a microprogram, and only such cells receive microinstructions.

a. Sample Microprograms

We now introduce some of the details of the microprogramming language by means of three examples.

For ease of understanding and to avoid the need to specify low-level details of the internal representation that are irrelevant here, we have chosen a representation for the microinstructions with an ALGOL-like appearance.

Since segments of microinstructions apply to constituents of the operator and operand, and these constituents form blocks of a partition of the RA in L, we arrange the segments of the microprogram in a linear sequence so that the order of the segments will match the order of the corresponding constituents in L. Because of this simple positional correspondence, the only information that has to be attached to any segment of microinstructions is the description of the constituent to which it applies (e.g., a single symbol with a given level number), and we shall call such a description a destination expression.

Our first example, shown in FIG. 17, is a microprogram for the primitive meta operation AL.

The destination expressions of this example show the ways the microprogramming language deals with those aspects of the RA that become known only at runtime:

(1) The microprogram is written with the assumption that the level number of < symbol is 0 (whenever an RA is located, these so-called relative level numbers—RLN for short—are computed for each symbol by subtracting the true, or absolute, level number—ALN—of the < symbol from the ALN of the symbol in question.

(2) The destination expression (E/i) indicates that the same segment of microprogram is to be sent to all symbols of a well-formed expression whose leftmost symbol has RLN=i. (The size of this expression will generally be unknown prior to execution. Section B. 6. b. describes how all symbols of this expression are located.) The destination expression (S/i) indicates that the segment is to be sent to a single symbol with RLN=i.

In the microinstructions, S, RLN, and POS# refer to registers of the cell 1400 of L, executing the microinstruction in question (see B. 4. a.).

The numeric labels in front of statements indicate the state of the cell of L in which the statement in question should be executed. Statements within a segment are executed in their order of occurrence. Some statements (e.g., erase) need no label because their time of execution is determined in some other way.

The phrase "mark with x" activates the only available mechanism to analyze a sequence into its components. As a result of executing this statement, the whole marked expression is considered a sequence, and its component expressions receive a number in their POS# register indicating their position in the sequence, and their LENGTH registers receive a number indicating the number of elements of this sequence. (The full effect of the mark statement is explained below, whereas the process of marking an expression, which begins in state 5 and ends in state 8, is described in B. 6. c.)

With these comments the microprogram for AL should now be readable. It says: the leftmost symbol of the RA should have RLN=0, and this symbol should be changed to (. We need not verify that this symbol is <, since the RA is located on the basis of its being a <. The next symbol from left to right must be ( with RLN=1; if it is, it should be changed to <; alternatively we signal an error. The next symbol—whatever it is—should have RLN=2, and it should be erased. (Again, we known it is AL, since the microprogram was brought in on that basis). The next expression, which is the parameter of the AL operator, should be left alone (its leftmost symbol must have RLN=2). Following that is the operand expression, whose leftmost symbol must have RLN=1. We erase this leftmost symbol if it is (, otherwise signal an error. In addition, all component expressions of the operand with the exception of the first will have their RLN reduced by one.

We introduce some further details of the microprogramming language by showing a microprogram for the primitive AND in FIG. 18.

This example introduces what can be called the message mechanism, providing a means of communication among cells of L during execution, which is the chief requirement of type B processing. A variety of send commands exists for the purpose of broadcasting information in active areas. A message sent by a send1C statement moves up the area simultaneously with the state change 4→5. The command in our example has the form "send1C (binary operator, operand)," which causes the operands to be combined according to the binary operator as they move up in T. Hence only one message (containing the result) reaches the top of the active area; that message is broadcast down to every cell of L in the active area. Any cell can pick up the result in its M2 register, but in our example only one cell is programmed to do so, by means of the statement S:=M2(1).

A microprogram for AA, shown in FIG. 19, will illustrate how type C processing is specified.

This microprogram implements AA as shown in FIG. 7: the originally existing copy of f is left in place, and becomes the operator of y1, and n−1 additional copies of </1 and f/2 are created in front of y2 through yn.

The operand expression is marked with y; this causes the elements of the operand sequence to be indexed by setting the values of the POS# registers. Thus if a symbol appears in the ith element of the operand sequence, the POS# register of the cell which holds the symbol will be assigned the value i. We insert </1 on the right of y1 through yn−1 by writing "insert (right, <, 1)," and insert f/2 on the left of y2 through yn by writing "insertE (left, x, +0)." In the latter case x is the symbol with which we marked every symbol of the expression f, and since the information we are inserting comes from the source text and not from the microprogram, we give an increment (+0) to the original RLN instead of a new value for RLN.

The insert commands result in insertions adjacent only to the leftmost or rightmost cell of the expression to which they apply. Information to control where the insertion is made is in the L/R registers of an expression, placed there in the process of marking the expression. Consider, for example, the statement "if POS# <LENGTH then insertS (right, <,1)." This is received by every symbol of the operand. The condition holds only in cells containing symbols of y1 through yn−1. Moreover, we do not want to perform insertions next to each symbol of these expressions, only at the right end of their rightmost symbols. The command "insertS (right, <, 1)" will be executed only in cells whose L/R register contains the value "right".

b. Description of Microprogramming Language

The microprogramming language we are to describe is capable of expressing the computational requirements of a large number of primitives. It has been used to write microprograms for many primitives, including most of those considered by prior art publications. Although the language has an ALGOL-like appearance, the simplicity of the constructs allows a very concise encoding into an internal representation.

A segment of a microprogram is composed of a destination expression, followed by a sequence of labelled or unlabelled statements. The permissible destination expressions are S/i and E/1 with $0 \leq i \leq 3$, implying that beyond relative level number three we cannot distribute different microinstructions to different expressions (the reasons for this restriction will will be explained in Section B. 6. b.).

Every statement should be preceded by a numeric label, unless (1) is a mark, erase, or no-op statement, (2) it is one of the arms of a conditional, (3) it is a send statement other than send1 ( . . . ) or send1C ( . . . ), or (4) it uses some of the message registers (M1 through M4). Any integer used to designate a state in the state diagram (FIG. 13) can appear as a label of a statement.

The conditional has the form: if <predicate> then <statement> else <statement>. Neither arm of a conditional may be another conditional, or a mark statement. The predicate is formed from relational expressions, with the help of Boolean operators, assuming certain reasonable length restrictions. In a relational expression the usual relation operators ($=, \neq, <, \leq, >, \geq$) may compare constants, contents of any of the registers of the cell of L, or values of arithmetic expressions formed thereof (again assuming certain length restrictions).

In an assignment statement on the lefthand side one can write only S or RLN (all other registers of cells of L are set only in specific contexts, e.g., by some of the other statements), whereas on the righthand side one can write a constant, the name of any register of the cell of L, or an arithmetic expression formed thereof assuming that certain length restrictions apply. When all quantities are available, the righthand side of the assignment statement is evaluated and stored in a temporary register (S' or RLN'); the time of evaluation should be indicated in the statement label, if possible. The assignment itself, however, is executed only at the final stage of the processing of the RA.

The erase statement clears all registers of the cell of L at the end of the processing of the RA.

The send statement is used to send messages to the top of the area, from where they are broadcast to all cells of L that are contained in the area. Sending and processing of different messages can be overlapped in time if the relative order is immaterial. Sequencing is made possible by indexing the messages and message with index $i+1$ is sent only after all messages with index $i$ have arrived at their destination. Indexing is done by using send statements of the form: sendi ( . . . ), where $i=1, 2, 3, \ldots$. The parameters of the send statements shown above are the messages to be sent. The number of parameters is varying, but should not exceed some specified value. (We have needed at most four so far, so we choose the maximum to be four.) The messages sent by send1 ( . . . ), send2 ( . . . ), etc. will not interact with any other message in T. On arrival back at L the parameters of these send statements are placed into registers M1, M2, M3, and M4 of each cell of L in the area, ready to be used by the microprogram. Since registers M1 through M4 accept every message arriving at the cell of L in question, whenever their names appear in an expression in the microprogram, that expression is evaluated for every message accepted. (M1 through M4 are used most frequently in conditionals, since usually some part of particular message is sought depending on some condition.) We can distinguish between messages produced by send1 ( . . . ), send2 ( . . . ), etc. by writing M1(1), M1(2), etc.

As an alternative, we may want the messages to be combined whenever they meet in some cell of T, such as adding them up, or selecting the larger one (see also the microprogram for AND above). Such send statements are written as send1C ( . . . ), send2C ( . . . ), etc., and their first parameter is the operator specifying the rule of combination. Statements of the forms sendi and sendjC must have ($i \neq j$). Moreover, for any value of i, only one operator can be used in statements of the form sendiC. The second, third, and fourth parameters of sendiC statements are to be combined separately according to the specified operator, and their results end up in registers M2, M3, and M4.

All the statements of the form send1 ( . . . ) or of the form send1C ( . . . ) should be labelled, each with the same label, chiefly to indicate whether the results of the mark statement are needed to generate the messages. Other send statements, i.e., sendi ( . . . ) and sendiC ( . . . ), where $i<1$, should never be labelled.

Any segment can contain only one mark statement, and such a statement cannot be either arm of a conditional. As a result, every cell of L receiving the mark statement will be marked, and furthermore only constituents of the source text that have their own destination expressions can be marked. The full effect of the mark statement is explained with the help of FIG. 20. Registers N1 and L1 make it possible, for example, to write microprograms to compare two arbitrary expressions for equality, or to insert the whole marked expression somewhere else in the program. Registers POS# (position number) and LENGTH allow us to write microprograms to do different things to different elements of the marked sequence, and they, combined with registers N2 and L2, will allow us to insert the component expression of this sequence at different places in the program. Finally, register L/R is used to locate the left or right end of any of the component expressions, in order to be ableto make an insertion there. (The process of assigning values to these registers is described in B. 6. c. )

The insert statement has three variants. InsertS is used whenever a single symbol is to be inserted from the microprogram. Its form is insertS (left/right, symbol, RLN). The first parameter specifies whether the symbol is to be inserted on the left or on the right end of the expression holding the insert statement in question. The second and third parameters are the symbol to be inserted and its RLN. InsertE is used whenever an expression (possibly a single symbol) is to be inserted from the program text. Its form is insertE (left/right, marker, increment to RLN). The first parameter is the same as in the case of insertS. The second parameter identifies the symbol or expression to be inserted, which must have been marked. The third parameter specifies how to adjust RLN of the symbol or expression to be inserted.

InsertC is used whenever a component of a marked sequence is to be inserted. Its form is insertC (left/right, marker, POS#, increment to RLN). The third parameter specifies which component of the marked sequence is to be inserted.

Although the microprogramming language described above has some powerful features (especially the send, mark, and insert statements), it is basically a low-level language. It can be used to full advantage only if one understands the operation of the processor to a sufficient degree.

This language often allows several different microprograms to be written for the same primitive. The easiest examples to illustrate this involve some rearrangement of the operand. Consider a primitive EXCHANGE, whose effect is <EXCHANGE, (x, y)>→(y, x).

It is possible to write a microprogram that leaves the expression x in place, inserts y on its left and erases the original copy of y from the program text. As an alternative, it is possible to write another microprogram that leaves y in place, inserts a copy of x on its right, and erases the original copy of x from the program text. Since for a short while two copies of y (or two copies of x) must exist in L, it would be desirable to move the shorter one of x and y. Since the lengths of x and y become known only at runtime, a third version of the same microprogram could test the lengths of x and y and move the shorter of the two.

One more issue that should be briefly mentioned is testing the syntactic correctness of the whole RA. Since the RA may be an arbitrarily long expression, with arbitrarily deep nesting, its syntactic correctness cannot always be fully tested by the processor. However, the following tools are available: (1) the segments of the microprogram must match the corresponding constituents of the program text, otherwise an error message is generated (when the microprogram is distributed, the only thing the processor will have to do is to observe whether there are any segments of the microprogram that find no destination with the specified description or there are any occupied cells of L in the active area that received no microinstructions); (2) the microprogram can do some further checking of syntactic correctness with the help of the mark statement and conditionals.

In fact, experience has convinced us that this kind of syntactic checking, in which syntax errors are discovered only when they prevent further processing, is extremely helpful.

6. Internal Mechanism

Most processing activities are decomposed into elementary, component activities, and these component activities are "hardwired" into the cells of T and L, ready to be activated in certain states of these cells. The program text in L, and the microprograms corresponding to the operators of the innermost applications, only initiate these so-called internal mechanisms and supply parameters for them.

In this section we describe all six of these internal mechanisms. The first two of them, described in 6. a. and 6. b., are initiated by the reduction language text in L. The other four are initiated by certain microinstructions: 6.c. describes how the mark statement is implemented, 6. d. describes the implementation of the send statement and 6. e. and 6. f. describe what happens as a result of executing insert statements.

The description of these mechanisms amounts to specifying what an arbitrary cell of T and L does in certain states. Since we want to describe only the essential aspects of these mechanisms and omit the less interesting details, we choose to supply a register-level description specifying how many registers are needed by the cell in a given state, what kind of information they must hold, and how their contents are computed.

The computations are described using various informal means, such as tables, flow charts, algorithms in an ALGOL-like language, and plain English. In describing computations that take place in a node of T (or in a node of an area) the values associated with the chosen node of T (or with the node of the area) are indicated by index 1; those associated with the left and right successor nodes, by indices 2 and 3.

6. a. Partitioning

In section B. 2. we have already explained what the partitioned processor is like. Here we describe the process by which the cells of T are partitioned in response to the contents of L.

Partitioning, as indicated in FIG. 13, takes place in two successive states in a mode I operation. Upon entering states k+1 (k=0, 30, 50), left ends are located, and on entering k+2 (K=0, 30, 50), right ends are located. When an innermost application is first located, its area goes through states 1-2-.... Partitioning in states 31-32-... and in 51-52... takes place whenever the RA has already completed part of its processing, and has been moved to a different part of L as the result of storage management, where it has to rebuild its area. (It can rebuild its area because symbols are erased and new symbols created only when it is known that the RA will not have to go through storage management again.) In 31-32-... the requests of the RA for space have not yet been satisfied: in 51-52-... space has been granted, but there are still messages to be sent or data to be moved.

First we describe what happens in states k+1, and consider state 1 in detail, since it subsumes the cases of states 31 and 51. In the process of locating left ends, by the time information from L reaches the top of the area, we must be able to determine (1) if the area is active, and (2) if so, which microprogram to ask for. The answer to (1) is produced as described in Section A. 4., whereas the answer to (2) is specified by FIG. 21, in which X, Y, and Z denote the first three symbols to the right of <. Consequently, to produce the answers to (1) and (2), the following information must be available: (1) the absolute level number (ALN) of the < symbol, (2) ALN of the next < symbol on the right when it exists (we shall call this the right neighbour of the < symbol, (3) the smallest ALN of any symbol in between, which we denote by MLN, and (4) the three leftmost symbols of the program text between the two < symbols, denoted by X, Y, and Z.

In order to make all this information available in the right place, information in the following format will be passed from each cell of T to its parent cell: (MLN, X, Y, Z, <, <, MLN, X, Y, Z), where the < symbols represent the ALN of certain application symbols. To simplify matters we shall use M to denote the collection of MLN, X, Y, and Z, and indicate groups of unused registers by a dash.

There are four general cases which describe the information passed upward between two nodes of T, and they all make some statement about the segment of L under the cell of T which sends the information:

F=(--, --, --, M)

the segment contains no < symbol; field 4 refers to the whole segment, which may contain zero or more symbols.

G=(--, --, <, M)

the segment contains exactly one < symbol, which is to be found in the leftmost cell of the segment; field 3 holds the ALN of that symbol; field 4 refers to the rest of the segment, which may contain zero or more symbols.

H=(--, <, <, M)

the segment contains at least two < symbols; the leftmost cell 8 of the segment contains an < symbol; field 2 contains the ALN 9 of that symbol; field 3 contains the ALN of the rightmost < symbol in the segment; field 4 refers to the segment to the right of the rightmost < symbol, which may contain zero or more symbols.

I=(M, <, <, M)

the segment contains at least one < symbol; the leftmost cell of the segment does not contain an < symbol; field 1 refers to the leftmost cells of the segment on the left of the leftmost < symbol; field 2 holds the ALN of the leftmost < symbol; field 3 holds the ALN of the rightmost (which may also be the leftmost) < symbol in the segment; field 4 refers to the rest of the segment on the right of the rightmost < symbol, which may contain zero or more symbols.

As an illustration, in FIG. 10 some links among cells of T are labelled with one of F, G, H, and I. (Single links are always labelled with F or G; double links, with H or I.)

Using the notation just developed, FIG. 22 specifies how an arbitrary cell of T is partitioned in response to the information arriving at it (in the form of F, G, H, or I) from the lower levels of T, and what information is to be sent further up the tree. Each of the 4 *4=16 different input combinations produces one of the eight possible partitioning patterns, shown on the left of FIG. 22 in our symbolic notation, and one of the four possible output combinations.

FIG. 22 indicates that a node of T may be required to do any of the following processing activities in the course of partitioning:

(1) route contents of registers from input to output (as in FIG. 22b);

(2) combine two M fields (as in FIG. 22a) by taking the minimum of the two arriving MLN values, and by keeping the three leftmost symbols from the six arriving ones;

(3) whenever an application symbol meets its right neighbour (as in FIG. 22b), determine by testing according to Section A. 4. if the area is active (in FIG. 22, "RA" denotes, and a brace connects, the fields whose contents are to be used in the test);

(4) if the cell in question is the root node of T, then it declares (as it would in FIGS. 22a and 22b) that the rightmost application located in L, and corresponding to fields denoted by "ra" in FIG. 22, is an innermost application;

(5) if the cell contains the root node of an active area, then the root node determines which microprogram to ask for.

The processing activity may be performed in a node of the area which is below the top of that area. The test of Section A. 4. requires that an arbitrary < symbol be brought together with the nearest < symbol on its right in L (recall that we decided to refer to them as neighbours), and hence we shall have to make sure that each < symbol will go up in T far enough to meet both its right and left neighbours: an arbitrary < symbol will learn from its right neighbour if it is the left end of an RA, and it will tell its left neighbour if the left neighbor is the left end of an RA. (The two special cases, the leftmost and the rightmost < symbols in L, must go up to the root cell of T to find out about their special status.) As an example, consider the third area from the left in FIG. 10. The < symbol of this area moves through cells 120 and 110, and in 105 it meets its right neighbour, which came through cells 122 and 111. The test of A. 4. is executed here, in cell 105, and the area is declared active. However, the top of this area is further up, in cell 102, where this < symbol meets its left neighbour, which came through cells 117, 108 and 104.

We may summarize the process of locating left ends as follows. All < symbols begin to move towards the root of T simultaneously, each one causing nodes of T to be partitioned (according to the rules of FIG. 22), each one carving out an area for itself. (It might be helpful to imagine that each < symbol is building a "wall" through T, which is to become the left-hand boundary for that area.) The < symbols climb up in T only until they meet both their neighbours. By the time the root node of T enters state $K-1$, the process of locating left ends is completed, the root nodes of active areas are all known, and each such root node knows what microprograms is to be applied to its RA.

During the next downward cycle, while entering states $K+2$, the following occurs in the active areas just located: (1) ALN of the < symbol is sent to every symbol of the RA, in order that they can compute their RLN; (2) the right end of the RA is located, and subtrees of the area whose leaves hold symbols of the program text not in the RA are cut off from the active area.

Location of the right end of an RA is carried out with the help of a two-bit code W, indicating which of three possible statements characterizes a node of the active area: if $W=00$, then the whole subtree under the node should be cut off; if $W=11$, then the whole subtree remains in the active area; and if $W=10$, then the dividing line is in the subtree. W is initialized to 10 on top of the area, and further W values are computed with the following rules: (1) if a node has only one successor in the area, W is propagated one level down; (2) if a node has two successors in the area, FIG. 23 gives the rule to compute the value of W for the two successor nodes. (In FIG. 23, ALN1 is the ALN of the < symbol, and MLN was left in the nodes of the area by the previous upward cycle.)

FIG. 24 shows an example for locating the right end of an RA, also indicating the values of W at certain points in the active area. (A subtree being cut off from an active area means that only state changes can get through the dividing line. As a result, such a subtree will go through the same sequence of state as the active area, but no processing will take place in it.)

b. Distribution of Microprograms

In this section we describe how segments of the microprograms find their way from the top of the active area to their respective destinations in L. The outline of this process is as follows. With state change $k+2 \rightarrow k+3$ (an upward cycle) certain information is placed into nodes of the active area. This information, which we call the directory, will permit the segments to navigate downward through the area to their destinations. As soon as parts of the top cell of T enter states $k+3$, the microprograms requested begin moving in (see B. 7.).

This is a mode II operation, in which information is flowing only towards L. The microprograms move through T, and no state changes occur until all microprograms have moved through the root cell of T. The next state change $k+3 \rightarrow k+4$ moves down T following the last microprogram, and hence when cells of L enter state $k+4$, they will have received all their microinstructions and will be ready to begin execution.

The directory has three components, denoted by P, Q, and R, which contain information about the distribution of RLN's in the segment of L under the node of the active area in question. P contains the total number of 1's in the segment (P can be 0, 1, or 2), Q contains the number of 2's after the last 1 from left to right (Q can be arbitrarily large), R contains the number of 3's after the last 2 from left to right (R can be arbitrarily large). The rules to compute the directory are contained in FIG. 25.

The nature of the directory underlies the restrictions we had to place on the destination expressions. Since the directory has no information about symbols with $RLN \geq 4$, destination expressions cannot be of the form either E/i or S/i where $i \geq 4$.

FIG. 26 shows the essential features of distributing microinstructions in an active area. The segments of the microprogram enter on the top of the area, one after another. Each segment is broadcast to every cell of L in the area, but only occupied cells that are specifically instructed to accept a segment will do so. The instruction to accept a segment is generated on the top of the active area, and it travels just in front of the segment to which it applies.

As FIG. 26 suggests, specifying the symbols (possibly only one) that should accept the segment of the microprogram in question can be done by specifying the two end-points of an interval of cells in L. Any symbol in the RA with RLN<3 can be pinpointed by specifying a triple (p,q,r) with the following interpretation: starting at the left end of the RA, pass by p symbols with RLN=1, then pass by q symbols with RLN=2, then pass by r symbols with RLN=3; this puts you to the immediate right to the symbol desired. If, on the top of an active area, we have the specification of a single-symbol in the form of such a triple, then the directories contain information to enable usto fine this symbol by moving down through the area. Thus these triples serve the functions of an "absolute address."

Although the symbols in L have only their RLN stored with them, the directories stored in T give us the effect of having a triple stored with each symbol of the RA, as illustrated by FIG. 27. This figure also suggests an easy way to specify intervals that contain expressions of unknown size: we shall say that an expression extends (from left to right) from (p, q, r) up to but not including (p', q', r')—for example, we do not have to know how many symbols there are in the operator expression to be able to say that it extends from (1,0,0) up to but not including (2,0,0).

Using this method of specification, the cell on the top of the active area will use the destination expression (which gives a "relative address") of the next segment to be distributed, and the second triple of the preceding segment to produce two such triples (each one an "absolute address") specifying a sequence of cells in L which are to accept the segment of the microprogram in question. We will forego giving further details of the process of distributing microprograms.

c. Marking Expressions

In Section B. 5. B., FIG. 20 was used to illustrate the full effect of the statement "mark with x", in which the programmer chooses the symbol x only to distinguish this mark statement from others in the same area. The mark statement also causes a number of registers to be set in each marked cell of L. This statement is implemented in each appropriate cell of L as follows: (1) in state $k+4$, the microprogram places x into the MARKER1 register, and if $RLN=j+1$, then x is also placed into the register MARKER2 (here j is the RLN of the leftmost symbol of the marked expression, which can be obtained by the cell from the destination expression), (2) next, during cycles $k+4 \rightarrow k+5$ and $k+5 \rightarrow k+6$ the values in N1 and L1 are generated from the markers in MARKER1, and at the same time the values in POS# and LENGTH are generated from the markers in MARKER2, (3) finally, during cycles $k+6 \rightarrow k+7$ and $k+7 \rightarrow k+8$, the contents of POS# are considered as markers, and the process is repeated, resulting in values placed into N2, L2 and L/R. (On occasion we shall refer to the computation of N1, L1, POS#, and LENGTH from MARKER1 and MARKER2 as first-level marking, and to the computation of N2, L2, and L/R from POS# as second-level marking).

When the mark statement is executed, nearly the same marking process is performed three times, and so we explain only the common aspects in them. Certain details that we omit, such as algorithms to place serial numbers not only into marked cells but also into unmarked one on their rights (as in the computation of POS#), and algorithms to pinpoint the leftmost and rightmost cells of an expression (as in the computation of L/R), can be obtained with minor modifications of the algorithms that follow.

Let us first consider a single mark statement in the whole area, and only the computation of N1 and L1. In the upward cycle we count the number of occurrences of the marking symbol x, and put the counts—called SUM—in nodes of the area. During the next downward cycle we index the symbols of the marked expression with positive integers, and place the index of each symbol in N1. This is done by computing and sending down each branch the index (denoted by IN) of the leftmost marker in the segment. After initializing IN to 1 on the top of the area, the algorithm of FIG. 28 can be used in each node to compute IN.

At the same time that values are being computed for N1, the value for L1, denoting the total number of symbols in the marked expression, is broadcast to all cells of the area; this is equal to the value of SUM at the top of the area.

However, we may have to consider a large number of different marker symbols in the same active area in both first and second-level markings, partly because the second-level marking in a single-mark statement requires it, and partly because there can be an arbitrary number of different mark statements, one per segment of the microprogram in the active area. All marked expressions on the first level are mutually disjoint, because any segment of the microprogram contains at most one mark statement, and all marked expressions on the second level are mutually disjoint, because they are elements of sequences marked on the first level. On the other hand, the unbounded number of different markers in an area might signal complications in trying to carry out all these markings at the same time. Fortunately, we can argue that any node of an active area is required to be involved in at most four marking processes on either level of markings.

The outline of the argument is as follows. Assume that the segment of L under a node of the active are contains symbols marked with A, B, Y, and Z, in that order from left to right. The expressions marked with B and Y are fully contained in the segment, and thus the numbers of their occurrences are already known, and need not travel any higher up in the area. On the other hand, the expressions marked with A and Z may not be fully contained in the segment, so the number of their occurrences will have to move higher up in the area to be totaled up. This means that any link inside an active area will have to carry the partial totals of the leftmost and rightmost expressions marked in the segment, and consequently any node will have to deal with at most four such partial totals arriving at it. This argument strongly resembles the one discussed at length under partitioning, and so we do not elaborate any further on it.

d. Messages

The message mechanism, activated by send statements, is the chief means of communication between the cells of L holding an RA. The microprogram determines which cells send messages, it specifies when the first set of messages should be sent, and it determines which cells accept which messages.

Two problems arise in the implementation of the message mechanism:

(1) Whenever messages are sent which are to be combined (i.e., their processing is a mode I operation), we must insure that all and only those are combined that are supposed to be.

(2) Whenever messages are sent that are not to be combined (i.e., their processing is mode II operation), they must all pass through the root node of the area one by one. The length of such a process is data dependent, and we must allow adequate time for its completion.

Sequenced messages are distinguished by the value of i in the sendi statements. These indexed messages will never interfere with each other, because sendi+1 cannot begin unless sendi is over. The completion of sending all messages with index i can be detected by the cell on top of the active area, simply by observing that there are no more messages trying to go through it. Then a completion signal can be broadcast to all cells of L in the area, initiating the next set of indexed messages, or leading to the transition 61→12 (unless data movement in the same area is still going on).

A solution to problem (1) is provided by allowing no more than one operator to occur for each value of i in the sendiC statements of any microprogram.

A solution to problem (2) is the following. In state 4 all the microprograms are already in the cells of L. With transition 4→5 determine if there is any chance of not being able to deliver all the messages in the basic cycle (state 1 to 12), and if so, the area chooses 16, instead of 6, as its next state. (The presence of insert statements in the area also results in this transition.) A simple way to determine which state to enter after state 5 is the following: choose 16 as the next state whenever (1) there is any sendi (as opposed to sendiC) state in the area, or (2) there are only sendiC statements, and a certain relationship holds between the maximum value of i and the statement label of sindIC statements statements, and a certian relationship holds between the maximum value of i and the statement label of sind1C statements (e.g., if send1C is labelled with 8, there is time between states 8 and 12 for at most send1C and send2C).

Once 16 is chosen as the next state after 5, the sequence of states for the area is 16- . . . -24-51-52- . . . (unless the area contained insert statements, and was forced to enter state 40 after 19—see Section B. 6. f. 1. ), after which it can go through the state sequence 51 through 64 as many times as necessary to complete the process of delivering all the messages. Delivery of messages will have to be periodically interrupted, because in states 63 and 64, storage management is taking place. To avoid any ill effects of such a interruption, we permit cells in L to emit messages only in states 52 through 60. As soon as a node of the area enters state 61, all messages in it that are on their way up have their direction reversed, and are sent back to the cells of L which emitted them. By the time the root node of the area enters state 61, all messages in the area are moving downward, and by the time L enters state 62, T is empty and storage management can begin. (Messages that were not able to reach their destinations will be sent again during the next cycle.)

e. Data Movement

Type C processing requirements are alway implemented with insert statements, which in turn, utilize data movement and storage management. Storage management involves sending data along the cells of L. Data movement involves sending data from L through T and back to L. Data movement is alway initiated by insert statements, and it is the only means of duplicating and rearranging parts of the RA. It has similarities with the message mechanism (in particular, with sending messages that are not to be combined), so we will comment only on the differences.

Whereas in the message mechanism the writer of the microprogram specifies the messages at will, during data movement the "message" that has to travel through the active area consists of a data marker, and the final values of the S and RLN registers of the cell. A data marker is a unique, composite information item, which guides the data to its destination. There are two kinds of data markers: whenever a whole marked expression is inserted, the contents of the register pair (MARKER1, N1) will serve as such; when, however, only an element of the marked sequence is inserted, the contents of the register triple (MARKER1, POS#, N2) will be used.

Whereas messages are sent by cells in which a send statement is executed, the sources of data movement are marked expressions named in insertE or insertC statements. Copies of these marked expressions are to be inserted next to the cell of L in which the insertE or insertC statement is executed. The process of marking expressions is complete in state k+8, and during the next cycle--with state changes k+8→k+9 and k+9→k+10—these insert statements can notify all marked expressions that are to be moved. The details of this process are explained in section B. 6. f. 1.

Whereas messages that are sent are accepted by cells containing RA symbols whose micronistructions refer to registers M1 through M4, the data items broadcast similarly during data movement are accepted by cells which are empty cells except for a cell marker. (Since such cells are not completely empty, we will call them "reserved".) A cell marker contains the same information as a data marker; it identifies the cell of L in which it resides as the destination of a data item carrying the corresponding data marker. The cell markers originate in cells of L holding the corresponding insert statements, and they are placed in the empty cells during storage management. When a reserved cell accepts a symbol and its RLN, they are placed in registers S' and RLN', and only at the end of processing the RA are these values transferred to registers S and RLN.

Whereas messages can sometimes be sent between states 4 and 12, data movement will always take place in state 52 through 61, irrespective of the number of data items to be moved. This is because in type C processing at least one symbol of the program text must be created that was not there to begin with, so reserved cells in L are created in the right places, through the process of storage management, to accommodate these new symbols.

f. Storage Management

This section describes the other internal mechanism involved in implementing the insert statement. This mechanism, called storage management, uses the information provided by the parameters of the insert statement to create the required reserved cells wherever insertions are to be made. This is done by shifting the contents of occupied cells in L. (In this section, whenever there is no danger of misinterpretation, we refer to the contents of an occupied or reserved cell simply as "symbol.") Storage management never changes the reduction language program text in L, i.e., it does not create or destory symbols, it does not change the left-to-right order of symbols in L, it only changes the distribution of empty cells in L (some of which become reserved in the process).

Since the number and distribution of empty cells in L is constantly changing, there is never any guarantee that whenever an RA needs additional empty cells, these empty cells will be available in its own area. Therefore, in order to have the greatest likelihood of providing all the empty cells wherever they are needed, we must abandon the existing partitioning of T, and perform storage management in the whole processor simultaneously.

f1. Preparation for Storage Management

Before storage management begins, the following information is placed into every cell of L: during storage management w symbols will enter the cell from left (or right), and $w-1$, w or $w+1$ symbols will leave it on the right (or left). The totality of these pairs of integers in L will be called the specification of storage management.

Preparation for storage management means finding a specification for storage management with the following properties: (1) it is consistent (meaning it will not destroy symbols by, for example, trying to force two symbols into one cell), (2) it satisfies as many requests for insertions as possible, and (3) whenever it is not possible to satisfy all requests for insertions, it will satisfy all requests of some RA's so that they may proceed with execution, and it will cancel all requests of the other RA's so that they do not tie down any resources unnecessarily. (The cancelled requests will, of course, be made again at a later time.)

Most of the computations involved in the preparation for storage management are not affected by area boundaries. In order to explain these computations, we shall assume that each cell of T will be able to hold six values, denoted by PT, NT, PTOP, E, BL, and BR, to be defined later. In addition, cells of L will have values of PT, NT, BL, and BR.

Although in FIG. 13 only states $k+9$ through $k+12$ are indicated as preparing for storage management, this preparation really begins in state 4. At this time all insert statements are recognized by the root node of the area, and if there is at least one of them in the area (even if only in a conditional, and eventually not executed), the area goes through the state transition 5→16. Each insert statement is said to represent a certain number of insertion requests, each of which is a request for a single reserved cell. By the time cells in L enter state 18, marking of all expressions has ended, and the length of every expression to be inserted has been determined at the location of the expression, although it is not yet known at the places of insertion. (In other words, an insert statement may not yet know how many insertion requests it represents.)

Now we need the following definitions: in an arbitrary node t of T (1) PT is the total number of insertion requests in all the areas whose tops are in the subtree of T whose root is t (for the root node of T, PT is equal to the total number of insertion requests in L, but a similar statement does not necessarily hold for other nodes of T).

(2) NT is the total number of empty cells in the segment under t.

(3) PTOP is the number of insertions requests in the areas whose tops are in t; PTOP=0 if t does not contain the top of any area. (The root cell of T may contain the tops of as many as four areas; other cells of T may contain the tops of zero, one, or two areas.)

With transition $k+8\rightarrow k+9$ the values of PT, NT, and PTOP are computed in each cell of T in the following manner.

NT is computed in cells of T by totally disregarding area boundaries: NT1=NT2+NT3. In cells of L, NT of each cell is set to 1 if the cell is empty and 0 if it is not.

PTOP is computed by adding up the insertion requests in each active area separately. The lengths of expressions to be inserted must be made available at the points of insertion. Only in state $k+8$ does it become known which cells are to execute insert statements, and what the lengths of all the marked expressions are (the first needs L/R; the second, L2). The cells holding insert statements know the identity of the expressions to be inserted but not their lengths; the cells holding marked expressions have all the length information needed. The former send information to the top of the area in the form of (CT, ID); the latter, in the form of (length, ID). In both formats either ID=marker, or ID=(marker, position#), and CT is used to accumulate the number of different insert statements which will need the expression denoted by ID. While these items of information are moving up in the active area, (1) superfluous items, such as extra copies of the same length information, can be thrown away, (2) the items can be sorted, so that they arrive at the top in order of, say, increasing ID, and (3) the values of CT for each ID can be accumulated. Point 2 means that the top does not have to store an unlimited number of items, it only has to compute for each ID PTOP=PTOP+CT* length. (Also, (1) (CT, ID), which comes from an insert statement, is broadcast to L so that the marked expression corresponding to ID will learn that it will have to move during data movement, and (2) (length, ID), which comes from a marked expression, is broadcast to L so that the insert statement, which wants to insert the marked expression corresponding to ID, will learn the length of that expression.)

PT is produced by each cell in T by computing PT1:=PT2+PT3+PTOP; in L, PT=0.

Having computed PT and NT in the root cell of T, we can decide how many insertion requests to cancel temporarily. One of the many possibilities is to carry out the following computation on top of T: assuming we want to keep a fraction p of L empty at all times, NT-PT should be at least as much as p * (2n), where 2n is the number of cells in L. If this is not the case, we have to retain some empty cells by cancelling at least E insertion requests, where E must satisfy NT−PT+E≧p * (2**n). We therefore compute on the top of T a value E=p * (2**n)−NT+PT. (Note that since p * (2**n)≦NT is guaranteed by the previous storage management, from the above formula to compute E we get E≦PT, and hence the required number of cancellations can always be made.)

Next, with state change k+9→k+10, we start moving downwards in T, cancelling all insertion requests of some areas. If E1>0 (there are still some cancellations to be made in this subtree), and PTOP>0, then E1′:=E1−PTOP (cancel all insertion requests of these areas temporarily, and make them enter state 40, instead of 20, from state 19). If E1′>0, divide E1′ up between the two subtrees in such a way that both will be able to make the necessary number of cancellations. This means E2 and E3 are defined by the equation E2+E3=E1′ and by the ratios E2:E3 and PT2:PT3 being equal. Since PT2+PT3=PT1−PTOP, E2:E1′=PT2: (PT1−PTOP) and E3:E1′=PT3: (PT1−PTOP) will also have to be satisfied, so the rules of computation can be E2:=PT2*(E1′/(PT1−PTOP)) and E3:=PT3* *(E1′/(PT1−PTOP)) (Note that since originally E1≦PT1, and also E1′≦PT1−PTOP, as a consequence E2≦PT2, and E3≦PT3, and hence all cancellations can be performed.) This way a certain number of active areas are selected for temporary cancellation, and the ones selected are the ones whose tops are closest to the top of T.

It may happen that this algorithm cancels all insertion requests in the processor, thus preventing any further execution. One possible reason for this is the arbitrary order in which this algorithm makes the cancellations. (As an example, consider L containing only two RA's, one requesting 50 empty cells, the other one requesting 200 empty cells, with E=60; the above algorithm will in some circumstances cancel both requests.) In this case, the problem can be circumvented by a more "clever" algorithm for cancellations, such as one in which the value of E can change dynamically. In other circumstances, L may simply not have enough empty cells. In some cases this problem can be alleviated by temporarily removing part of the program. We shall not elaborate on either of these solutions any further.

The first half of preparing for storage management ends when cells of L enter state k+10. Those in 10 or 60 are in areas without insertion requests, those in 40 had their insertion requests cancelled temporarily, and those in 20 are going to have their insertion requests satisfied.

During the second half of the preparation, we compute the specification of storage management, and this computation too goes across area boundaries. Now there are four values of interest associated with each cell of T, each holding some information about the segment of L under the cell of T in question:

(1) NT is the number of empty cells in the segment;

(2) PT is the number of insertion requests in the segment (notice that the interpretation of PT has changed somewhat, and its value must be recomputed);

(3) BL (boundary condition on the left) specifies the number of symbols to be moved into the segment from its left (BL can be either positive or negative);

(4) BR (boundary condition on the right) specifies the number of symbols to be moved into the segment from its right (BR can be either positive or negative).

During the next upward cycle, with state change k+10→K+11, PT is recomputed. The rule of computation is PT1=PT2+PT3, where on the lowest level of T, PT1 is set according to the insertion requests of adjacent cells of L. (The value of NT, denoting the number of empty cells, remains unchanged.)

During the next downward cycle, with state change k+11→K+12, the values of BL and BR are computed as follows: (1) on top of T, BL:=BR:=0 (no cells are moved across the endpoints of L).

(2) starting at the root node of T, information flows downward, and in an arbitrary cell of T BL2:=BL1, BR3:=BR1 (these are boundary conditions already given), and BL3:=BR2 (this follows from our convention for signs). To compute BR2, we set S2=BL2+PT2−NT2 and S3=PT3−NT3+BR3, and set the value of BR2 by the following expression
if (S2≧0)≡(S3≧0)
then 0
else if |S2| ≧ |S3|
then S3
else −S2.

The formula shows that symbols are moved across segment boundaries only if absolutely necessary. If sign (S2)=sign (S3), then no movement takes place between the two segments, because both of them have enough empty cells. If, on the other hand, sign (S2)≠sign (S3), then min (|S2|, |S3|) symbols are moved across the boundary, the sign of the value of the expression properly specifying the direction of the movement.

The BL and BR values computed by this algorithm, and placed into cells of L, constitute the required specification of storage management.

FIG. 29 shows an example of this second half of preparing for storage management, the computation of the BL and BR values.

f2. Storage Management Process

With state change k+12→k+13 the process of storage management—the only mode III operation—begins, and we use FIG. 30 to explain its most important aspects. FIG. 30, which consists of seven consecutive snapshots of L, exhibits the movement of symbols, which takes place according to the specification whose preparation is shown in FIG. 29.

During storage management, the contents of occupied cells are shifted in L, and some empty cells become reserved by having cell markers placed into them. We will describe a scheme in which each occupied cell C(i) moves in one direction during the first N (i) steps of the process, and then remains in that position for the duration of the process. Moreover, no occupied cell will collide with any reserved cell.

We assume that the specifications were generated by the algorithm of the previous section. In order to perform storage management as we have described, the cell markers must be laid down in a certain fashion. Consider a cell of L with BL=1 (one symbol is to enter on the left), and BR = −3 (three symbols are to leave on the right). Such a cell has insertion requests inside it, since BR+BL≦1, and consequently it must be occupied. These two facts imply that the three symbols to leave on the right must be the original symbol in the cell and two reserved cells to be generated next to it. But the symbol which will enter on the left of the cell in question may occupy the adjacent cell of L, in which case it will enter the cell in question during the first step. The only way this can be achieved as if the original symbol (together with the information about what cell markers it should generate) leaves the cell on the right during the first step, and as it moves from cell to cell in L, it leaves behind the correct cell markers and the original symbol in their correct final position.

FIG. 30 shows two examples of this. The third cell of L from the left had an insertion request of 6 on its left, so it must lead to six reserved cells (labelled with a1 through a6), followed by the original symbol. The specification says this must be brought about by emitting two symbols towards the left, leaving one in the cell, and emitting four on the right. The cell can easily determine that it should emit a1 on the left (together with the instruction to leave a2 behind on the way), should leave a3 in the cell, and should emit the original contents of the cell on the right (together with the instructions to leave a4, a5, and a6 behind on the way). (Note that only during the first step does a symbol leave this cell on the right, but that symbol really represents four symbols: a4, a5, a6, and itself.)

The sixth cell of L from the left had two insertion requests, each of value two on its two sides, so it must lead to two reserved cells (labelled with b1 and b2), followed by the original symbol, followed by the other two reserved cells (labelled with c1 and c2). The specification says this must be brought about by admitting two symbols from the left, and by emitting six symbols on the right. The cell then emits its original contents, representing five symbols, which on its way is going to lay down the required symbols in L.

By the time a cell enters state k+12 it has all the information necessary to determine what to emit, in what order, and in which direction. If the segment of microprogram in the cell has more than one insert statement executed, their textual positions in the segment will determine the relative order (from left to right) of the correspondingly inserted symbols and expressions in L. The insertS (left/right, symbol, RLN) statement carries the symbol to be inserted as a parameter; its execution leads to the second and third parameters being left behind in the appropriate cell of L. The insertE (left/right, marker, increment to RLN) statement is used for insertion of an expression from another part of the program; its execution leads to three values being left behind in consecutive cells of L: the marker, an index number (between one and the length of the expression to be inserted, which by not is known by the cell), and the increment to RLN (RLN will be updated during data movement). Similarly, the insertC (left/right, marker, POS#, increment to RLN) is used to copy an element of a marked expression; its execution leads to marker, POS#, an index number, and increment to RLN being left behind.

Now we can summarize what happens to the contents of an arbitrary occupied cell of L during storage management. When the process begins, the symbol starts to move as directed by BL and BR of the cell in which it resides. Whenever it crosses a cell boundary, the corresponding BL and BR values of the two cells are reduced (in absolute value) by j+1, where j is the number of cell markers (resulting from insertE and insertC statements) or additional symbols (resulting from insertS statements) it is going to leave behind on its way (each of these j cell markers and symbols is left in its final place, and it will not have to move again during this storage management). Whenever both BL and BR of a cell of L become zero, the cell sends a signal to this effect to its parent. Each cell of T, upon receiving a signal from both of its children, sends one to its parent. When these signals arrive at the root of T, state change k+13→k+14 takes place, storage management has ended, and the operation of the processor continues.

The operation of L during storage management can be likened to that of a so-called shift-register: the original contents of cells are shifted under local control (BL and BR), without any reference to their neighbours, because symbols will never get into each other's way. Storage management, however, is also a much more general process: different symbols may move in different directions and by differing amounts before coming to a halt.

It is easily seen that the total number of steps to complete a synchronous storage management is equal to the largest BL or BR value in L. If the largest BL or BR value is as small as possible, the specification of the storage management can be called optimal.

So far synchronous operation has been described because it has simplified the description. However, just as in every other context in this machine (see Section B. 3.), this is an assumption that need not be made.

This assumption would limit the size of machines of this sort that could be built. Further, the amount of information that has to be shifted from one cell to another (referred to as "symbol") may vary from cell to cell. (The symbol without insertion requests may consist of only S and RLN, or the old and new values of S and RLN if either of them is to be changed at the end of processing. If, however, the symbol has insertions requests, the corresponding information must also be carried, to be gradually left behind in cells of L.)

Storage management can be made fully asynchronous by requiring that a cell transfer its contents to one of its neighbours only if both cells are in state k+13, and if the neighbour has given permission for it. Such a process needs a local asynchronous control, such as described in the prior art.

7. Input/Output Operations

I/O is defined to be any communication between L and the outside world, and it always takes place through T. Assume for the sake of simplicity that the actual point of communication with the outside world is the root node of T. For larger sizes of the processor, the root mode will become a bottleneck, and a more satisfactory solution can be found, for example, by designating all cells of T on a particular level to be I/O ports. This raises two kinds of problems, both easily solved: (1) some active areas will have to be entered under their tops, and (2) these I/O ports will always have to know what part of the program text in L is under them. The first problem can be solved by first sending input information to the top of an active area, from which it is broadcast to the entire area. A problem similar to the second one has been solved in B. 6. b. with the help of the directory.

In order to outline a solution to the problem of I/O, postulate (1) an I/O processor which is not part of T or L, and which directly communicates with the (single) I/O port at the root of T, and (2) internal I/O channels between L and the I/O port. As FIG. 31 shows, there is a dedicated input channel and a dedicated output channel both in the form of a binary tree. These trees are both in a one-to-one correspondence with T, a fact depicted in FIG. 31 by superimposing them on T. This allows a connection to be set up between the corresponding nodes of T and the I/O channel, and thus the top of an area can immediately access either channel.

The operation of the input and output channel is nearly identical to a mode II operation inside an active area (see Section B. 3.). Information entering at the I/O port is broadcast down to each cell of L. On their way, copies of the information item pass by each cell of T, and one of them is thus guaranteed to arrive at the top of the active area which requested it (copies of the item reaching L directly via the input channel are thrown away). Information items sent by active areas through the output channel to the I/O port will have priorities assigned to then: requests for microprograms will have the highest priority, followed by requests for other kinds of input, whereas every other kind of output will have the lowest priority.

It should be understood that all I/O functions can also be accomplished by a parallel transfer from an external storage or buffer directly into cells in L without transmitting information through the tree network.

We distinguish four kinds of I/O: (1) bringing in microprograms (2) bringing in definitions (3) user specified I/O, and (4) loading and removing user programs.

Bringing in microprograms is characterized by the following:

(1) every RA needs a microprogram (2) information always moves from the I/O processor to L, (3) microprograms are "short"—microprograms we have written so far require from a few dozen to a few hundred bits for their internal representations, (4) there is no need to make room for microprograms in L—they are received and stored in designated parts of cells of L which hold symbols of the reduction language program.

Since the total volume of microprograms moved in at any time is relatively small and the microprograms must be moved in rapidly to be able to continue execution of the freshly located RA's, microprograms are treated differently from all other I/O. Whenever with state change 14→1 a new active area is located, information identifying the microprogram it needs is generated on the top of this area. In the same cell of T this information is placed on the output channel and is then sent to the I/O processor. Later, when parts of the top cell of T enter states k+3, the requested microprograms start moving in on the input channel. While microprograms are moving in through the I/O port, all other input traffic is interrupted and after all microprograms have entered state change k+3→k+4 takes place. From the input channel the miroprogram enters the active area on its top and with the help of the mechanism described in B. 6. b. it gets distributed in L. This organization implies that whenever more than one active area requests the same microprogram, only one copy needs to be sent in through the I/O port. (Such a situation arises frequently, for example as a result of using the operator AA.).

Bringing in definitions is requested whenever a defined operator is located in the operator position of an RA. It is characterized by the following:

(1) though not used in every RA, definitions have to be brought in frequently (defined operators correspond to conventional subroutines and their use in imperative in large programs), (2) information always moves from the I/O processor to L, (3) lengths of definitions vary widely, (4) because definitions become a part of the program text, room for them has to be made in L before they move in.

User specified input is requested whenever the RA has the following form: <INPUT, identification>. Here INPUT is a primitive operator, "identification" specifies the well-formed expression to be brought in and the above RA reduces to the expression that is brought in.

User specified output is generated whenever the RA has the form <OUTPUT, expression>. It reduces to "expression", and its side effect is to send "expression" out to the I/O processor.

Loading and removing user programs can be handled in the following way. L always contains a sequence whose elements are the different user programs. When preparation for storage management indicates that there is adequate space in L to accept a new user program, the I/O processor injects symbols into L corresponding to the RA<INPUT, program identifier>, and this new RA in turn brings in the new user program. Removal of a user program is performed whenever it has no more RA's in it.

User specified I/O as well as loading and removing user programs are characterized by the following:

(1) in general this type of I/O is least frequent, (2) it must be possible for information to move either into, or out of the processor, (3) the amount of information to be moved varies widely, (4) room has to be made in L whenever information is moved into L.

Input information other than microprograms can be moved through the I/O port in every state with the exception of k+3, when microprograms move in, and k+13 when storage management is taking place.

Requests for every kind of input other than microprograms occur with state change k+14→k+1 and length information comes in with the microprograms. If storage management can satisfy all insertion requests, the I/O processor is informed about it, and after storage management is complete, the input begins to move in. The active area to which the input is directed moves through states 51 through 64 as many times as necessary until the whole input expression has arrived User specified output enters the output channel from the top of the area, while the area is moving through states 51 through 64 as many times as necessary. The I/O processor can immediately detect when a user program contains no more RA's and then arranges for all symbols of this expression to enter the output channel directly from L.

C. Performance Evaluation

In this section, capabilities of the processor described will be examined with regard to execution times of individual user programs and throughput.

Parallelism On The Reduction Language Level

First let us assume that the processor holds a single user program. The processor will begin the reduction of all innermost applications simultaneously, and will complete all of them without delay, unless the total amount of expansion of the program text cannot be accommodated by L (in which case evaluation of some of the RA's will be temporarily delayed).

Thus the larger the number of RA's in the program text and the less frequent the delaying of their execution, the better the performance of the processor. Both of these factors are, to a considerable degree, under the control of the programmer. In the prior art it has been found that many frequently occuring programming problems permit, quite naturally, several different solutions with varying degrees of parallelism. (The operator AA provides one way of initiating several parallel execution paths.) In such problems there is a natural time-space trade-off; the programmer can choose the algorithm formulation most appropriate for the circumstances.

In the course of executing most user programs, the degree of parallelism is algorithm dependent, and a low degree is often unavoidable. Nevertheless, whatever the nature of the program might be, the processor initiates and terminates execution of RA's (i.e., execution paths) with ease.

If the single user program does not fill up the processor completely, additional user programs can be introduced into the available space. Executing several user programs simultaneously increases throughput without causing problems for the processor, because a collection of user programs can still be considered as a single expression in a reduction language.

Execution Time of A Single Reducible Application

In order to simplify the argument that follows, let us assume that the time needed to get through the state diagram (from states $k+1$ to $k+14$) is constant, and is denoted by S. Let us further assume that messages as well as symbols during data movement move through the top of the area at a constant rate. (Here we consider only messages that are not to be combined.)

If the RA in question has type A processing requirements, $m=0$, and the time needed for the reduction is exactly S. If the RA in question has type B or C processing requirements, then $m>0$, and the area will go through states 51- ... -64 as many times as necessary, each time delivering M messages. Consequently, the time needed to execute an arbitrary RA is given by the formula $S+[m/M]*S$. This nonlinear function is bounded from above by the linear function $(2*M-1+m)*S/M$. This simplified formula clearly indicates that beyond a certain lower limit the amount of data moved (or messages sent) is the dominant factor in the execution time of any RA.

A more careful look at what this simple formula says reveals that the many factors contributing to the execution time of an arbitrary RA can be classified as being either independent of, or dependent upon, the contents of L. Factors of the first kind could be called structural: they are determined by the processor implementation (e.g., speed of the logic circuits and the widths of data paths). Factors of the second kind are use-related: they are partly determined by the RA itself and by its microprogram (e.g., the intrinsic requirements of the operator for data movement, and how it is realized with the microprogram), and partly by what else is going on in the processor at the same time (i.e., what the "environment" of the computation is). Factors of this latter kind are attributed either to storage management, or to I/O, because these are the only ways two RA's might influence each other with regard to execution times. These use-related factors are again, to some degree, under the control of the programmer: execution times can be decreased by giving preference to operators with more limited requirements for data movement; writing programs that avoid frequent requests for large numbers of additional empty cells in L will decrease the time spent during storage management, and so on.

The formula given above for the execution time of an RA is simple enough to permit quantitative analysis of algorithms along these lines.

Throughput

In order to characterize the capabilities of the processor in quantitative terms, we shall derive a simple formula for the total amount of computational work performed by the processor in unit time (throughput).

We choose an RA for the duration of a complete processor cycle (states $k+1$ through $k+14$) as the unit of computational work, and call it an instruction. As a result, if an RA with type B or C processing requirements goes through m such cycles, it is counted as m instructions executed. It should be emphasized that what we call an instruction here may represent the computational work performed by many instructions of a uniprocessor (e.g., a type A RA might find the sum, product, minimum, maximum, etc. of an arbitrary number of elements, it might perform typical associative processor operations such as a search on an arbitrary number of elements, and so on).

The following formula can be used to depict the most important factors influencing throughput:

throughput $= D*N/(14*t*[\log N]+K)$ where

N is the number of cells in L,

D is the average number of RA's per cell of L (thus, $D*N$ gives the total number of RA's in the processor); D does not depend on N, but it does depend heavily on the nature of the programs currently in L, t is the average time state changes take to move from one level of T to another (not including time for bringing in microprograms or for storage management); t does not depend on N, but it is dependent on the speed of the logic circuits used, on the width of data paths, etc.

K is the average time used up in one complete processor cycle to bring in all microprograms requested, and to complete storage management; if I/O ports always serve subtrees of the same size in T, then K will not depend on N, but it will depend on the nature of the programs currently in L.

In the above formula the numerator stands for the total amount of computational work performed by the processor in one complete processor cycle (states $k+1$ through $k+14$), whereas the denominator stands for the duration of that cycle.

According to the above formula, arbitrarily large throughput values can be reached by increasing the size of the processor; if all other parameters remain constant, throughput increases as $N/\log N$. (Of course, it must be added that this processing power can be applied to solving any mixture of small and large problems, in contrast to a collection of stand-alone uniprocessors which might represent the same numeric throughput value, yet totally lacks the ability to cooperate in solving problems of varying sizes.

Cost-effectiveness

In this section we take a brief look at the price one has to pay for the performance of this processor, and consider some of the important aspects in a qualitative manner only.

The cellular nature of the processor has several beneficial effects:

(1) The one-time design costs of the cells of T and L would be divided up among a large number of such cells making up one or more instances of the processor.

(2) Both design and replication costs could be kept down since the amount of hardware contained in a cell of T or L is rather small, partly because local storage in either kind of cell is a moderate number of registers.

(3) Interconnection problems are eased, and pin restrictions are mitigated by the limited nature of interfaces: any cell of T or L communicates with at most three other cells. Moreover, any subtree of T whose leaves are cells of L communicates with the rest of the processor through at most three such points.

(4) Since only I/O ports have dedicated functions to perform in such a processor, the modular structure permits processors of widely varying sizes (but basically of the same design and using the same components) to be constructed, spanning wide ranges of performance.

Questions of hardware utilization inevitably enter considerations of cost-effectiveness. Although all cells of T and L always participate in storage management, and many of them frequently participate in I/O related activities, beyond that only those contained in active areas do useful work. Less than full utilization of hardware seems unavoidable in this processor, but it is by no means synonymous with wasting processing power. In fact, in some respects just the opposite seems to be the case: having enough empty cells in L inside and in the vicinity of an RA is a prerequisite for rapid storage management, and therefore empty cells in L should be considered as a resource whose availability generally speeds up processing.

Considering that the dominant component in the cost of present-day general purpose computers is the cost of software, the processor just described has some attractive properties:

(1) Parts of the usual system software (interpreter for the high-level language, memory management, etc.) have been replaced by hardware.

(2) Certain functions of present-day multiprocessor system software (detection of parallelism in source programs, assigning processors to tasks, etc.) have been taken over by harware.

(3) The programming language to which the processor responds directly and exlusively is expected to facilitate construction of correct programs.

D. SUMMARY

A cellular network of microprocessors is capable of efficiently executing reduction languages. Since the amount of hardware contained in each cell is small, networks composed of large numbers of cells—millions or more—can easily be envisioned.

One can consider the processor a general purpose one, since it acts as an interpreter for a high-level language. A machine of this type can execute any program written in a reduction language, and its satisfactory operation is not restricted to any particular class of problems. (One may want to consider it a special purpose processor for the very same reason, since it responds to nothing else but reduction languages.) The role of the reduction language is absolutely vital to the high performance of the processor: the programmer, by expressing his algorithm in this language, organizes his computation to facilitate efficient execution.

High performance can be attributed to massive parallelism both on and below the reduction language level. For this class of machines, the degree of parallelism on the language level is unbounded; space permitting, all reducible applications can proceed simultaneously. Parallelism below the language level is made possible by the assignment of the cells of L to individual symbols of the source text, and by the simple linear representation of the program text. Both levels of parallelism rely on the partitioning of the processor, which is a kind of self-organization: the processor organizes itself so that its structure will suit the current program text to be processed.

Since operator, operand, and result of a reducible application each may occupy a collection of contiguous cells in L, the processor finds it easy to deal with composite operators (programs) and composite operands (data structures) of differing sizes.

In the design we have presented there is no commitment to any particular set of primitives (i.e., to any particular reduction language); only the ability to execute the so-called microprogramming language is hardwired. This gives a great deal of flexibility in using the processor, and makes the amount of hardware in a cell independent of the kinds of programs that will be run on the processor.

The uses of the tree network T are manifold. It helps us reconcile the structural requirement for cellularity with the functional requirement of efficient, global control over the operation of all cells of L. We say we have efficient global control over all cells of L because we can influence all of them simultaneously, each one differently, and in $0(\log N)$ steps. Besides serving as an interconnection (routing) network, T has another unique ability: partial results can be stored in its nodes, the position of the node expressing many things about the partial result in it, such as which segment of L it applies to, what its relation to other partial results is, and so on.

Since a design must first be specified to a sufficient degree of detail before it can be analyzed and improved upon, many of the details in this disclosure were dictated by the desire to provide a reasonably simple and clear description. Many more or less obvious modifications can be made to the processor described here, improving execution time efficiency or reducing cell complexity, but complicating the description.

It should be noted that the present invention relates to a unique processor architecture and a method for efficiently and directly executing applicative languages by the architecture.

Apparatus shown in block diagram form is representative of building blocks of large scale integrated circuitry well known to persons skilled in the art of information handling system processor design and can be implemented by commercially available integrated circuits.

Blocks labelled control and partitioning are implemented by microprogram control circuits and storage of the type are currently available for use in the microprocessors.

Although the invention has been described with reference to a preferred embodiment thereof, it will be understood by those skilled in the art that various changes in the mechanism and apparatus may be made without departing from the spirit or the scope of the invention.

What is claimed is:

1. Information handling apparatus, for parallel evaluation of applicative expressions formed from groups of subexpressions, said groups being separated by syntactic markers, comprising:
 a plurality of interconnected cells, each containing at least one processor, each cell in a first set of said cells containing more than one processor, each of said processors in said cell in said first set being adapted to being connected in a disjoint assembly of processors independent from other processors in said cell;
 logic means for connecting said processors to form disjoint assemblies of said processors, said logic means being responsive to said syntactic markers to partition said plurality of interconnected cells into one or more disjoint assemblies of processors, each of said disjoint assemblies being adapted to evaluate a subexpression;
 means for entering applicative expressions into said cells and for removing results from said cells after evaluation of said applicative expressions.

2. Apparatus according to claim 1, wherein each disjoint assembly capable of evaluating a subexpression, comprises more than one processor.

3. Apparatus according to claim 1, further comprising a second set of cells, each cell containing one or more processors, each cell in said second set of cells being connected to one of said cells in said first set of cells.

4. Apparatus according to claim 3, wherein each cell of said second set comprises:
 means for storing one or more program text symbols and wherein each cell of said first set comprises means for moving and processing information as required by a microprogram control.

5. Apparatus according to claim 3, wherein each disjoint assembly comprises at least one processor in a cell of said first set and a plurality of cells of said second set.

6. An information handling system for parallel evaluation of applicative expressions formed from groups of subexpressions, said groups being separated by syntactic markers, comprising:
 a tree network of cells, each containing at least one processor, each cell in a first set of said cells containing more than one processor, each of said processors in said cell in said first set being adapted to being connected in a disjoint assembly of processors independent from other processors in said cell;
 a group of cells, each cell of said group connected to a cell in said tree network of cells;
 partitioning means within said tree network for separating said tree network and said group of cells into a plurality of areas.

7. An information handling system according to claim 6, wherein each cell of said group is adapted to contain at least one symbol of said applicative expression.

8. An information handling system according to claim 7, wherein each of said cells in said group is connected to the adjacent neighbor cells in said group to form a linear array of cells.

9. An information handling system according to claim 8, wherein symbols of an applicative expression are stored in said group of cells in an order in which said symbols occur in said applicative expression.

10. An information handling system according to claim 6, wherein each cell in said tree network comprises one or more processors which are operatively connected into areas under control of said partitioning means, said partitioning means being responsive to said syntactic markers.

11. An information handling system according to claim 10, wherein each cell in said tree network comprises two or more processors.

12. An information handling system according to claim 10, wherein said tree network further comprises plural information path interconnections between cells in said tree network to permit partitioning of said network into a plurality of areas.

13. An information handling system according to claim 6, wherein each cell in said group comprises a processor and a plurality of storage registers for storing characteristics associated with a symbol of an applicative expression to be contained in said cell.

14. Apparatus for managing storage in a linear array of interconnected cells, including occupied cells and empty cells, each said cell containing one or more storage registers, comprising:
 means for determining content of each cell, to determine whether said cell is occupied;
 means for specifying the number and location of insertion requests relative to said contents of occupied cells;
 means for reassigning said contents of said occupied cells based on the number and location of insertion requests;
 means for concurrently moving contents of said occupied cells to newly assigned cells; and
 means in each of said cells for maintaining the relative position of symbols in an expression.

15. A method for parallel evaluation of applicative expressions formed from groups of subexpressions in a network of processors, said groups being separated by syntactic markers, comprising the steps of:
 (a) entering information into a first group of cells, each cell containing at least one processor, each of said first group of cells adapted to contain at least one symbol of an applicative expression;
 (b) partitioning said network of processors into one or more disjoint assemblies of processors under control of information contained in said first group of cells; each disjoint assembly adapted to evaluate an executable subexpression;
 (c) executing an executable subexpression in each disjoint assembly containing an executable subexpression;
 (d) determining whether further executable subexpressions reside in said first group of cells;
 (e) repeating said partitioning step in accordance with information contained in said first group of cells after said executing step if further executable subexpressions reside in said first group of cells;
 (f) removing results from said first group of cells.

16. A method according to claim 15 wherein said step of partitioning said network of processors further comprises time multiplexing said processors to form disjoint assemblies of processors in the time domain.

17. A method according to claim 15, wherein said partitioning step further comprises the steps of:

(a) identifying symbols contained in said first group of cells which are syntactic markers;

(b) determining boundaries of a disjoint assembly of processors from a relative position of a syntactic marker within said first group of cells.

18. A method according to claim 17, wherein said executing step further comprises the steps of:

(a) identifying an operator within said executable subexpression, which operator is comprised of one or more symbols residing in one or more cells of said first group of cells;

(b) identifying an operand within said executable subexpression, which operand is comprised of one or more symbols residing in one or more cells of said first group of cells;

(c) obtaining a microprogram corresponding to said operator;

(d) distributing a portion of said microprogram to each cell of said first group within said disjoint assembly, said portion to be distributed to each cell determined by contents of said cell;

(e) executing said microprogram within said disjoint assembly on said operator and said operand residing in one or more cells of a first group within said disjoint assembly;

(f) placing results of said microprogram execution into predetermined cells in said first group within said disjoint assembly.

19. A method according to claim 18 further comprising the step of:

marking, under microprogram control, further subexpressions of said operator and said operand to permit said operator to selectively operate on different parts of said operator and said operand.

20. A method according to claim 18, wherein said executing step operates in one of three modes of operation identified as type A, type B and type C operation depending upon the microprogram instruction to be performed.

21. A method according to claim 20, wherein said step of executing a type A operation further comprises:

(a) executing an operation in a cell of said disjoint assembly of cells independent of operations in other cells of said disjoint assembly of cells.

22. A method according to claim 20, wherein said step of executing a type B operation further comprises:

(a) executing a microprogram instruction in a cell of said disjoint assembly of cells requiring information transmitted from one or more other cells in said disjoint assembly of cells.

23. A method according to claim 20, wherein said step of executing a type C operation further comprises:

(a) executing a microprogram instruction in a cell of said disjoint assembly requiring information transmitted from one or more other cells of said disjoint assembly;

(b) assigning cells in said group of cells, to accept and store symbols resulting from said executing step such that result symbols are contained in said cells in an order in which said symbols occur in a result expression, wherein said step of assigning cells may require assignment of cells outside boundaries of said disjoint assembly depending upon the length and form of the said result expression of said executing step.

24. A method according to claim 23, wherein said step of assigning further comprises the steps of:

determining for each cell whether said cell is occupied;

identifying insertion requests resulting from said executing step;

reassigning cells based on a number and relative position of insertion requests;

moving, substantially simultaneously, contents of said occupied cells to cells assigned in said reassigning step.

25. A method for managing storage in a linear array of interconnecting cells, including occupied cells and empty cells comprising the steps of:

determining for each cell whether said cell is occupied;

identifying insertion requests for additional cells;

reassigning cells based upon a number and position of insertion requests to be allocated;

moving, concurrently, contents of said occupied cells to newly assigned cells;

maintaining a relative position of symbols in an applicative expression.

26. A method according to claim 25, wherein said reassigning step further comprises:

specifying an amount of information to be moved through a left and a right boundary of each cell.

* * * * *